US012803634B2

(12) United States Patent
Chen et al.

(10) Patent No.: US 12,803,634 B2
(45) Date of Patent: Nov. 17, 2026

(54) VALIDATING CHANNEL STATE INFORMATION REFERENCE SIGNALS

(71) Applicant: QUALCOMM Incorporated, San Diego, CA (US)

(72) Inventors: Siyi Chen, Beijing (CN); Jing Sun, San Diego, CA (US); Arumugam Chendamarai Kannan, San Diego, CA (US); Giovanni Chisci, San Diego, CA (US); Vinay Chande, San Diego, CA (US); Xiaoxia Zhang, San Diego, CA (US); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 18/569,565

(22) PCT Filed: Aug. 6, 2021

(86) PCT No.: PCT/CN2021/111107
§ 371 (c)(1),
(2) Date: Dec. 12, 2023

(87) PCT Pub. No.: WO2023/010504
PCT Pub. Date: Feb. 9, 2023

(65) Prior Publication Data
US 2024/0275459 A1 Aug. 15, 2024

(51) Int. Cl.
*H04B 7/06* (2006.01)
*H04W 56/00* (2009.01)

(52) U.S. Cl.
CPC ........ *H04B 7/0626* (2013.01); *H04W 56/001* (2013.01)

(58) Field of Classification Search
CPC .. H04B 7/0626; H04W 56/001; H04L 5/0053; H04L 5/0091; H04L 5/0048
(Continued)

(56) References Cited

U.S. PATENT DOCUMENTS

2014/0355529 A1* 12/2014 Zhu ....................... H04L 5/0053 370/329
2020/0053792 A1 2/2020 Ryu et al.
(Continued)

OTHER PUBLICATIONS

International Search Report and Written Opinion—PCT/CN2021/111107—ISA/EPO—Jan. 26, 2022.

*Primary Examiner* — Obaidul Huq
(74) *Attorney, Agent, or Firm* — Holland & Hart LLP

(57) ABSTRACT

Methods, systems, and devices for wireless communication are described to support accounting for contention-exempt synchronization signal blocks (SSBs) when validating one or more channel state information reference signals (CSI-RS). A base station may transmit, to a user equipment (UE), an indication of the one or more contention-exempt SSBs, and the UE may determine to monitor for a configured CSI-RS if resources assigned to the CSI-RS fall within a time frame associated with the one or more contention-exempt SSBs. Similarly, the base station may transmit configured CSI-RS if resources assigned to the CSI-RS fall within a time frame associated with the one or more contention-exempt SSBs. The time frame associated with the one or more contention-exempt SSBs may include a slot that includes the SSB(s), a symbol that includes the SSB(s), symbols between the SSB(s), slots between the SSB(s), or any combination thereof.

30 Claims, 16 Drawing Sheets

(58) Field of Classification Search
USPC .......................................... 370/310, 328, 329
See application file for complete search history.

(56) References Cited

U.S. PATENT DOCUMENTS

2021/0127356 A1 4/2021 Agiwal
2022/0124510 A1* 4/2022 Baldemair ............ H04L 5/0053

* cited by examiner

VALIDATING CHANNEL STATE INFORMATION REFERENCE SIGNALS

CROSS REFERENCE

The present Application is a 371 national stage filing of International PCT Application No. PCT/CN2021/111107 by CHEN et al. entitled "VALIDATING CHANNEL STATE INFORMATION REFERENCE SIGNALS," filed Aug. 6, 2021, which is assigned to the assignee hereof, and which is expressly incorporated by reference in its entirety herein.

FIELD OF TECHNOLOGY

The following relates to wireless communication, including validating channel state information reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some base stations may perform a contention-based procedure to determine that communication resources are unoccupied before performing a downlink transmission, to a UE, using the communication resources. In some cases, the contention-based procedure may fail, such that the downlink transmission may be delayed or may not be transmitted.

SUMMARY

The described techniques relate to improved methods, systems, devices, and apparatuses that support validating channel state information reference signals. Generally, the described techniques provide for accounting for contention-exempt synchronization signal blocks (SSBs) when validating one or more channel state information reference signals (CSI-RS). For example, if a CSI-RS is configured to occur within a time frame associated with contention-exempt SSBs, a user equipment (UE) may monitor for the CSI-RS, for example, because the CSI-RS may be multiplexed with the one or more contention-exempt SSBs. A base station may transmit, to the UE, an indication of the one or more contention-exempt SSBs, and the UE may determine to monitor for a configured CSI-RS if resources assigned to the CSI-RS fall within a time frame associated with the one or more contention-exempt SSBs. Similarly, the base station may transmit configured CSI-RS (e.g., multiplexed with the one or more SSBs) if resources assigned to the CSI-RS (e.g., one or more of the first set of time periods) fall within a time frame associated with the one or more contention-exempt SSBs.

A method for wireless communication at a UE is described. The method may include receiving, from a base station, control signaling indicating a configuration of periodic CSI-RS (P-CSI-RS), where one or more first time periods are allocated to the P-CSI-RS, receiving an indication of one or more SSBs that are exempt from contention-based procedures, where one or more second time periods are allocated to the one or more SSBs that are exempt from contention-based procedures, and monitoring for the P-CSI-RS within one or more third time periods that each include at least a respective portion of the one or more first time periods, where the one or more third time periods are based on an overlap between the one or more second time periods and the one or more first time periods.

An apparatus for wireless communication at a UE is described. The apparatus may include a processor, memory coupled with the processor, and instructions stored in the memory. The instructions may be executable by the processor to cause the apparatus to receive, from a base station, control signaling indicating a configuration of P-CSI-RS, where one or more first time periods are allocated to the P-CSI-RS, receive an indication of one or more SSBs that are exempt from contention-based procedures, where one or more second time periods are allocated to the one or more SSBs that are exempt from contention-based procedures, and monitor for the P-CSI-RS within one or more third time periods that each include at least a respective portion of the one or more first time periods, where the one or more third time periods are based on an overlap between the one or more second time periods and the one or more first time periods.

Another apparatus for wireless communication at a UE is described. The apparatus may include means for receiving, from a base station, control signaling indicating a configuration of P-CSI-RS, where one or more first time periods are allocated to the P-CSI-RS, means for receiving an indication of one or more SSBs that are exempt from contention-based procedures, where one or more second time periods are allocated to the one or more SSBs that are exempt from contention-based procedures, and means for monitoring for the P-CSI-RS within one or more third time periods that each include at least a respective portion of the one or more first time periods, where the one or more third time periods are based on an overlap between the one or more second time periods and the one or more first time periods.

A non-transitory computer-readable medium storing code for wireless communication at a UE is described. The code may include instructions executable by a processor to receive, from a base station, control signaling indicating a configuration of P-CSI-RS, where one or more first time periods are allocated to the P-CSI-RS, receive an indication of one or more SSBs that are exempt from contention-based procedures, where one or more second time periods are allocated to the one or more SSBs that are exempt from contention-based procedures, and monitor for the P-CSI-RS within one or more third time periods that each include at least a respective portion of the one or more first time periods, where the one or more third time periods are based on an overlap between the one or more second time periods and the one or more first time periods.

Some examples of the method, apparatuses, and non-transitory computer-readable medium described herein may further include operations, features, means, or instructions for receiving an indication of a mode of operation of the base station, the mode of operation corresponding to whether transmissions to the UE from the base station may be contention-based and determining to monitor for the P-CSI-RS within the one or more third time periods based on the mode of operation corresponding to transmissions to the UE from the base station being contention-based.

Some examples of the method, apparatuses, and non-transitory computer-readable medium described herein may further include operations, features, means, or instructions for determining that a subset of the one or more first time periods overlap with a subset of the one or more second time periods, where monitoring for the P-CSI-RS within the one or more third time periods may be based on the determining, and where the one or more third time periods include the subset of the one or more first time periods.

Some examples of the method, apparatuses, and non-transitory computer-readable medium described herein may further include operations, features, means, or instructions for determining whether to monitor for the P-CSI-RS in a subset of the one or more first time periods different from the one or more third time periods based on a channel occupancy time (COT) of the base station, a grant of resources for a downlink shared channel, a grant of resources for aperiodic CSI-RS (AP-CSI-RS), or any combination thereof.

In some examples of the method, apparatuses, and non-transitory computer-readable medium described herein, the one or more second time periods include a set of slots, at least one SSB of the one or more SSBs transmitted in each slot of the set of slots.

In some examples of the method, apparatuses, and non-transitory computer-readable medium described herein, the one or more second time periods further include one or more slots exclusive of the one or more SSBs, the one or more slots intervening between a first slot and a second slot of the set of slots, the first slot associated with a first SSB of the one or more SSBs and the second slot associated with a second SSB of the one or more SSBs.

In some examples of the method, apparatuses, and non-transitory computer-readable medium described herein, the one or more second time periods include a starting symbol of a first SSB of the one or more SSBs, an ending symbol of a second SSB of the one or more SSBs, and any intervening symbols between the starting symbol of the first SSB and the ending symbol of the second SSB.

In some examples of the method, apparatuses, and non-transitory computer-readable medium described herein, the one or more second time periods include symbols occupied by the one or more SSBs.

Some examples of the method, apparatuses, and non-transitory computer-readable medium described herein may further include operations, features, means, or instructions for receiving an indication of one or more second SSBs that may be exempt from the contention-based procedures, where one or more fourth time periods may be allocated to the one or more second SSBs, and where a set of SSBs to which the contention-based procedures apply intervene between the one or more SSBs and the one or more second SSBs and monitoring for the P-CSI-RS within one or more fifth time periods that each include at least a respective portion of the one or more first time periods, where the one or more fifth time periods may be based on an overlap between the one or more fourth time periods and the one or more first time periods.

In some examples of the method, apparatuses, and non-transitory computer-readable medium described herein, one or more slots intervene between a first slot associated with a first SSB of the one or more SSBs and a second slot associated with a second SSB of the one or more SSBs, the one or more slots exclusive of the one or more SSBs.

In some examples of the method, apparatuses, and non-transitory computer-readable medium described herein, the P-CSI-RS may be multiplexed with at least one of the one or more SSBs over the one or more third time periods.

In some examples of the method, apparatuses, and non-transitory computer-readable medium described herein, receiving the indication of the one or more SSBs may include operations, features, means, or instructions for receiving an indication of a set of indices corresponding to the one or more SSBs, receiving an indication of a starting index of the one or more SSBs and a quantity of SSBs included in the one or more SSBs, receiving a starting time and a time duration for transmission of the one or more SSBs, and any combination thereof.

A method for wireless communication at a base station is described. The method may include transmitting, to a UE, control signaling indicating a configuration of P-CSI-RS, where one or more first time periods are allocated to the P-CSI-RS, transmitting, to the UE, an indication of one or more SSBs that are exempt from contention-based procedures, where one or more second time periods are allocated to the one or more SSBs that are exempt from contention-based procedures, and transmitting the P-CSI-RS within one or more third time periods that each include at least a respective portion of the one or more first time periods, where the one or more third time periods are based on an overlap between the one or more second time periods and the one or more first time periods.

An apparatus for wireless communication at a base station is described. The apparatus may include a processor, memory coupled with the processor, and instructions stored in the memory. The instructions may be executable by the processor to cause the apparatus to transmit, to a UE, control signaling indicating a configuration of P-CSI-RS, where one or more first time periods are allocated to the P-CSI-RS, transmit, to the UE, an indication of one or more SSBs that are exempt from contention-based procedures, where one or more second time periods are allocated to the one or more SSBs that are exempt from contention-based procedures, and transmit the P-CSI-RS within one or more third time periods that each include at least a respective portion of the one or more first time periods, where the one or more third time periods are based on an overlap between the one or more second time periods and the one or more first time periods.

Another apparatus for wireless communication at a base station is described. The apparatus may include means for transmitting, to a UE, control signaling indicating a configuration of P-CSI-RS, where one or more first time periods are allocated to the P-CSI-RS, means for transmitting, to the UE, an indication of one or more SSBs that are exempt from contention-based procedures, where one or more second time periods are allocated to the one or more SSBs that are exempt from contention-based procedures, and means for transmitting the P-CSI-RS within one or more third time periods that each include at least a respective portion of the one or more first time periods, where the one or more third time periods are based on an overlap between the one or more second time periods and the one or more first time periods.

A non-transitory computer-readable medium storing code for wireless communication at a base station is described. The code may include instructions executable by a processor to transmit, to a UE, control signaling indicating a configuration of P-CSI-RS, where one or more first time periods are allocated to the P-CSI-RS, transmit, to the UE, an indication of one or more SSBs that are exempt from contention-based procedures, where one or more second time periods are allocated to the one or more SSBs that are exempt from contention-based procedures, and transmit the P-CSI-RS within one or more third time periods that each include at least a respective portion of the one or more first time periods, where the one or more third time periods are based on an overlap between the one or more second time periods and the one or more first time periods.

Some examples of the method, apparatuses, and non-transitory computer-readable medium described herein may further include operations, features, means, or instructions for transmitting an indication of a mode of operation of the base station, the mode of operation corresponding to whether transmissions to the UE from the base station may be contention-based and transmitting the P-CSI-RS within the one or more third time periods based on the mode of operation corresponding to transmissions to the UE from the base station being contention-based.

Some examples of the method, apparatuses, and non-transitory computer-readable medium described herein may further include operations, features, means, or instructions for determining that a subset of the one or more first time periods overlap with a subset of the one or more second time periods, where transmitting the P-CSI-RS within the one or more third time periods may be based on the determining, and where the one or more third time periods include the subset of the one or more first time periods.

Some examples of the method, apparatuses, and non-transitory computer-readable medium described herein may further include operations, features, means, or instructions for determining whether to transmit the P-CSI-RS in a subset of the one or more first time periods different from the one or more third time periods based on a COT of the base station, a grant of resources for a downlink shared channel, a grant of resources for AP-CSI-RS, or any combination thereof.

In some examples of the method, apparatuses, and non-transitory computer-readable medium described herein, the one or more second time periods include a set of slots, at least one SSB of the one or more SSBs transmitted in each slot of the set of slots.

In some examples of the method, apparatuses, and non-transitory computer-readable medium described herein, the one or more second time periods further include one or more slots exclusive of the one or more SSBs, the one or more slots intervening between a first slot and a second slot of the set of slots, the first slot associated with a first SSB of the one or more SSBs and the second slot associated with a second SSB of the one or more SSBs.

In some examples of the method, apparatuses, and non-transitory computer-readable medium described herein, the one or more second time periods include a starting symbol of a first SSB of the one or more SSBs, an ending symbol of a second SSB of the one or more SSBs, and any intervening symbols between the starting symbol of the first SSB and the ending symbol of the second SSB.

In some examples of the method, apparatuses, and non-transitory computer-readable medium described herein, the one or more second time periods include symbols occupied by the one or more SSBs.

Some examples of the method, apparatuses, and non-transitory computer-readable medium described herein may further include operations, features, means, or instructions for transmitting an indication of one or more second SSBs that may be exempt from the contention-based procedures, where one or more fourth time periods may be allocated to the one or more second SSBs, and where a set of SSBs to which the contention-based procedures apply intervene between the one or more SSBs and the one or more second SSBs and transmitting the P-CSI-RS within one or more fifth time periods that each include at least a respective portion of the one or more first time periods, where the one or more fifth time periods may be based on an overlap between the one or more fourth time periods and the one or more first time periods.

In some examples of the method, apparatuses, and non-transitory computer-readable medium described herein, one or more slots intervene between a first slot associated with a first SSB of the one or more SSBs and a second slot associated with a second SSB of the one or more SSBs, the one or more slots exclusive of the one or more SSBs.

In some examples of the method, apparatuses, and non-transitory computer-readable medium described herein, transmitting the P-CSI-RS may include operations, features, means, or instructions for multiplexing the P-CSI-RS with at least one of the one or more SSBs over the one or more third time periods.

In some examples of the method, apparatuses, and non-transitory computer-readable medium described herein, transmitting the indication of the one or more SSBs may include operations, features, means, or instructions for transmitting an indication of a set of indices corresponding to the one or more SSBs, transmitting an indication of a starting index of the one or more SSBs and a quantity of SSBs included in the one or more SSBs, transmitting a starting time and a time duration for transmission of the one or more SSBs, and any combination thereof.

DETAILED DESCRIPTION

Figure 1:
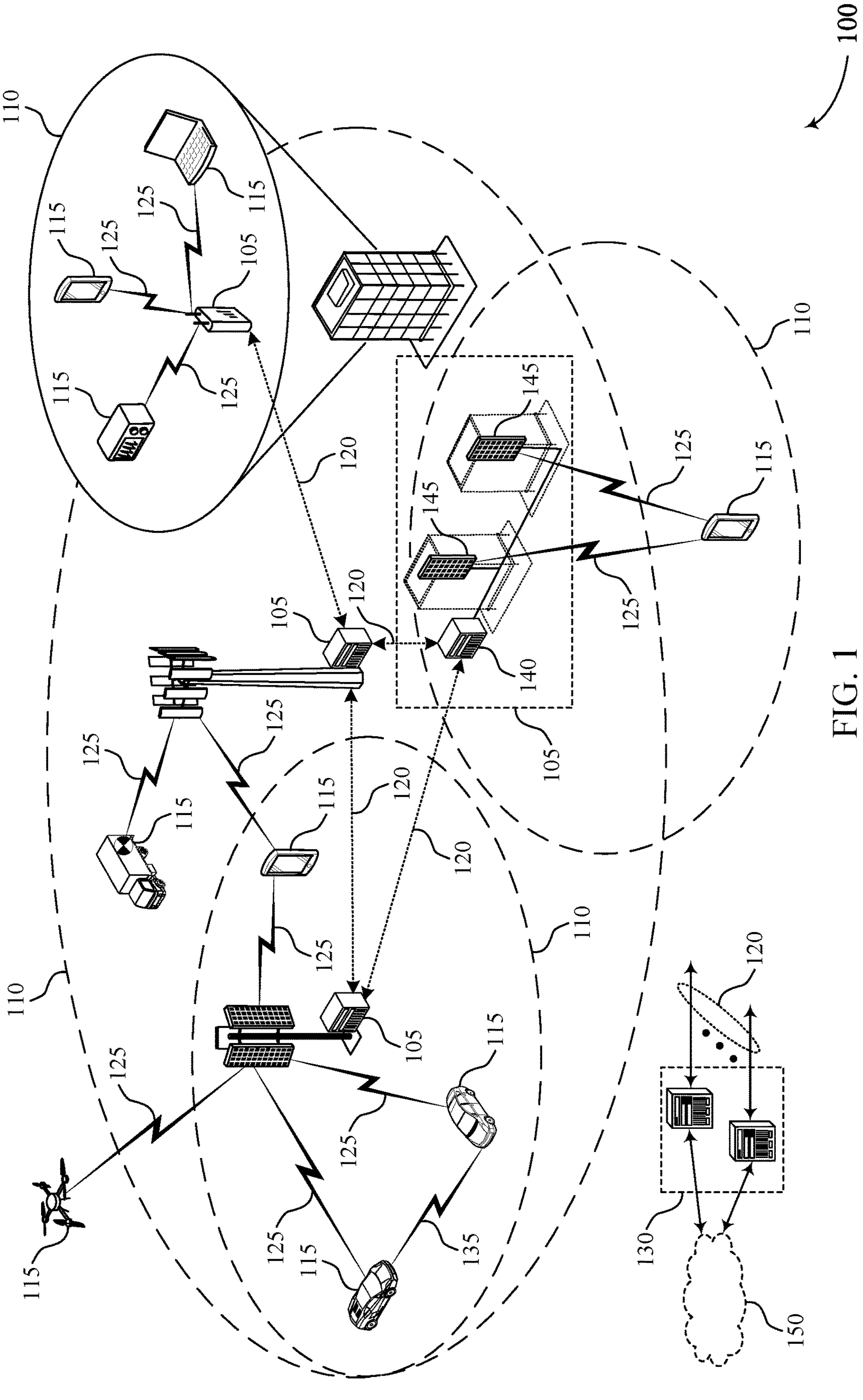
FIG. 1 illustrates an example of a wireless communications system that supports validating channel state information reference signals (CSI-RS) in accordance with aspects of the present disclosure.

A base station may communicate with a user equipment (UE) via one or more downlink transmissions, which may include or be associated with channel state information reference signals (CSI-RS). Some CSI-RS may be semi-statically configured by the base station or otherwise configured to occur on a periodic basis, which may be referred to as periodic CSI-RS (P-CSI-RS). In some cases, downlink transmissions from the base station, such as the P-CSI-RS, may be subject to contention-based procedures. For example, in a contention-based procedure, the base station may determine whether communication resources (e.g., time and frequency resources, such as a communication channel) are unoccupied by other transmissions before using the communication resources for downlink transmissions. In cases where the contention-based procedure fails (e.g., the channel is occupied), the P-CSI-RS may not be transmitted by the base station even if it was otherwise configured (e.g., scheduled) to occur. In order to conserve power (e.g., battery) and processing time, the UE may determine whether a configured P-CSI-RS will actually be transmitted during a time period, for example, before monitoring for the P-CSI-RS within the time period. Such techniques may be referred to as validating the P-CSI-RS, or validating the time period, and may be performed in order to avoid monitoring for P-CSI-RS that may not be transmitted (e.g., based on a failure of a contention-based procedure).

In some cases, the base station may transmit synchronization signal blocks (SSBs), at least some of which may be exempt from contention-based procedures (e.g., may be transmitted without first performing a contention-based procedure). Further, in some such cases, a base station may multiplex one or more types of signals (e.g., time-division multiplex or frequency-division multiplex) with SSBs. At least some such types of signals (e.g., the SSBs, the multiplexed signal(s)) may be referred to as short control signals or short control signaling. In some wireless communications system, a base station may be able to multiplex P-CSI-RS with SSBs, and some validation techniques for P-CSI-RS may fail to account for contention-exempt SSBs (e.g., fail to account for the potential multiplexing of P-CSI-RS with contention-exempt SSBs), which may result in decreased opportunities for the UE to monitor for and thus receive P-CSI-RS. For example, in some cases where P-CSI-RS may be configured to occur during a time period that includes or is otherwise associated with one or more contention-exempt SSBs, a UE relying on validation rules that fail to account for contention-exempt SSBs may determine that the P-CSI-RS will not be transmitted by the base station and may refrain from monitoring for the P-CSI-RS, even though the P-CSI-RS may be transmitted in a contention-free manner.

The present disclosure provides techniques to increase a quantity of opportunities and thus time (e.g., communication resources) during which the UE may monitor for P-CSI-RS, for example, by accounting for contention-exempt SSBs within one or more P-CSI-RS validation rules (e.g., one or more CSI-RS validation techniques as described herein). For example, if a P-CSI-RS falls within a time frame associated with contention-exempt SSBs, the UE may monitor for the P-CSI-RS, for example, because the P-CSI-RS may be multiplexed with the one or more contention-exempt SSBs (e.g., the UE may consider the time frame as valid or validated for P-CSI-RS monitoring purposes).

In some cases, a base station may transmit, to the UE, an indication of one or more contention-exempt SSBs, and the UE may determine to monitor for a configured P-CSI-RS if resources assigned to the P-CSI-RS fall within a time frame associated with the one or more contention-exempt SSBs. Similarly, the base station may transmit configured P-CSI-RS (e.g., multiplexed with the one or more SSBs) if resources assigned to the P-CSI-RS (e.g., one or more of the first set of time periods) fall within a time frame associated with the one or more contention-exempt SSBs. As described herein, the time frame associated with the one or more contention-exempt SSBs may include a slot during which the SSB(s) are transmitted, one or more symbols during which the SSB(s) are transmitted, symbols between the SSB(s), slots between the SSB(s), or any combination thereof.

Aspects of the disclosure are initially described in the context of wireless communications systems. Aspects of the disclosure are further illustrated by and described with reference to signaling schemes, a process flow, apparatus diagrams, system diagrams, and flowcharts that relate to validating channel state information reference signals.

FIG. 1 illustrates an example of a wireless communications system 100 that supports validating CSI-RS in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA).

Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 may transmit, to a UE 115, an indication of the one or more contention-exempt SSBs, and the UE 115 may determine to monitor for a configured CSI-RS if resources assigned to the CSI-RS fall within a time frame associated with the one or more contention-exempt SSBs. Similarly, the base station 105 may transmit configured CSI-RS if resources assigned to the CSI-RS fall within a time frame associated with the one or more contention-exempt SSBs. The time frame associated with the one or more contention-exempt SSBs may include a slot for the SSB(s), a symbol used by the SSB(s), symbols between the SSB(s), slots between the SSB(s), or any combination thereof.

Figure 2:
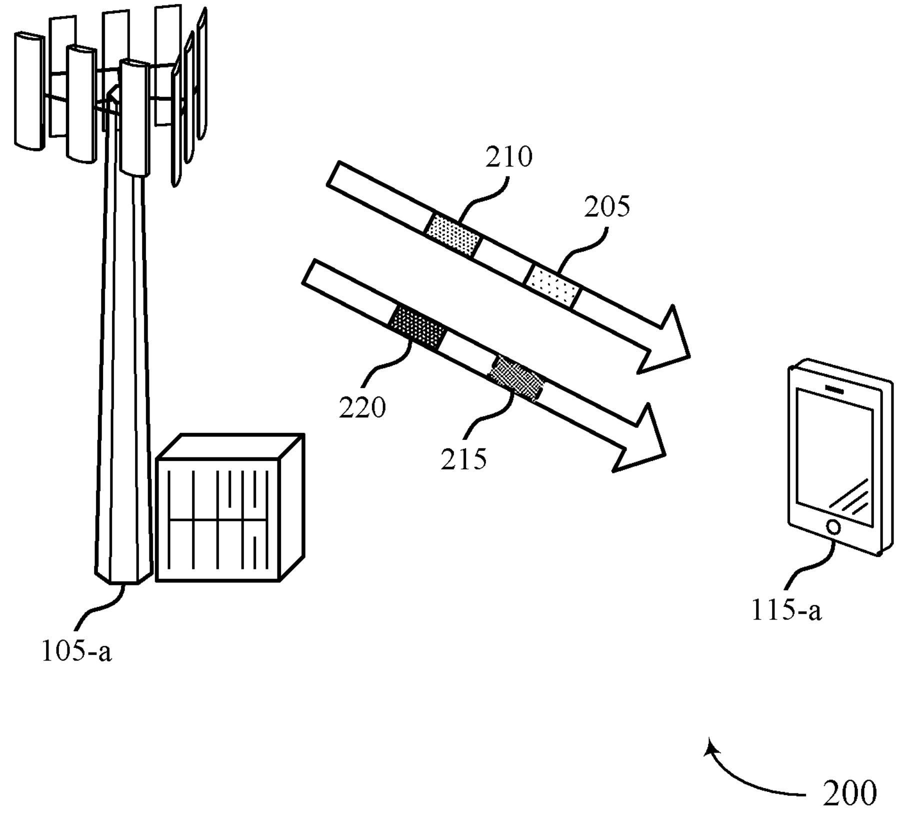
FIG. 2 illustrates an example of a wireless communications system that supports validating CSI-RS in accordance with aspects of the present disclosure.

FIG. 2 illustrates an example of a wireless communications system 200 that supports validating CSI-RS in accordance with aspects of the present disclosure. Wireless communications system 200 may implement one or more aspects of wireless communications system 100. For example, wireless communications system 200 may include a the base station 105-*a* and a the UE 115-*a*, which may be examples of a base station 105 and a UE 115 as described with reference to FIG. 1.

The base station 105-*a* may communicate with the UE 115-*a* via one or more downlink transmissions, which may include or be associated with CSI-RS. The UE 115-*a* may receive and process (e.g., measure) the CSI-RS and may perform channel state information (CSI) reporting to the base station 105-*a* based on receiving the CSI-RS. Based on the CSI reporting, the base station 105-*a* may change or alter one or more parameters of the downlink transmissions, which may result in a higher communication quality, higher downlink throughput, or lower latency (e.g., based on a reduced amount of negative feedback), among other examples.

In some cases, CSI-RS may be configured dynamically by the base station 105-*a*, which may be referred to as aperiodic CSI-RS (AP-CSI-RS). Additionally or alternatively, CSI-RS may be semi-statically configured by the base station 105-*a*, which may be referred to as P-CSI-RS. For example, the base station 105-*a* may transmit control signaling 205, which may configure the UE 115-*a* with a set of P-CSI-RS 215. The set of P-CSI-RS 215 may be configured to repeat according to a pattern configured by the base station 105-*a*, and may be allocated a first set of one or more time periods. Based on the configuration received (e.g., via the control signaling 205) from the base station 105-*a*, the UE 115-*a* may monitor for the P-CSI-RS 215 in the indicated first set of time periods (e.g., such that the UE 115-*a* may receive, measure, and report on the P-CSI-RS 215).

In some cases, downlink transmissions from the base station 105-*a*, such as the P-CSI-RS 215, may be subject to contention-based procedures (e.g., listen before talk (LBT) procedures). For example, in a contention-based procedure, the base station 105-*a* may determine that communication resources (e.g., time and frequency resources, such as a communication channel) are unoccupied by other transmissions before using the communication resources for downlink transmissions. In some cases, the contention-based procedure may include an LBT procedure or a clear channel assessment procedure, among other examples. Performing an LBT procedure may include monitoring communication resources (e.g., time and frequency resources, such as a channel) for a period of time, in order to determine whether one or more other transmissions are taking place via the communication resources. Based on performing a contention-based procedure, the base station 105-*a* may determine whether the communication resources are occupied.

If the communication resources are occupied (e.g., the contention-based procedure fails), the base station 105-*a* may refrain from transmitting one or more downlink signals using the communication resources. If the communication resources are unoccupied (e.g., the contention-based procedure passes), the base station 105-*a* may transmit downlink signaling using the communication resources. In cases where the contention-based procedure fails (e.g., the channel is occupied), the P-CSI-RS 215 may therefore not be transmitted by the base station 105-*a*. In order to conserve power (e.g., battery) and processing time, the UE 115-*a* may determine whether a configured P-CSI-RS 215 may be transmitted during a time period, for example, before monitoring for the P-CSI-RS 215 within the time period. Such techniques may be referred to as validating the P-CSI-RS 215 or the time period, and may be performed in order to avoid monitoring for P-CSI-RS 215 that may not be transmitted (e.g., based on a failure of a contention-based procedure).

Mechanisms to validate P-CSI-RS 215 may include determining whether the P-CSI-RS 215 is scheduled to occur within a channel occupancy time (COT) established by the base station 105-*a* or within a time period (e.g., set of symbols) corresponding to a shared channel or AP-CSI-RS transmission scheduled for the UE 115-*a* (e.g., scheduled by the base station 105-*a*). For example, if a P-CSI-RS 215 transmission is configured to be transmitted within (e.g., located within) a COT duration established by the base station 105-*a*, the UE 115-*a* may monitor for the P-CSI-RS 215 during the configured transmission time. Otherwise (e.g., if a configured P-CSI-RS 215 falls outside of a COT duration) the UE 115-*a* may refrain from monitoring for the P-CSI-RS 215 (e.g., may cancel reception of the P-CSI-RS 215). The base station 105-*a* may provide the COT information, for example, via a field of a downlink control information (DCI), such as a slot format indicator (SFI) field or a COT duration field of a DCI format 2_0.

In some cases, the base station 105-*a* may provide the COT information via a COT structure indication, which may indicate a remaining length of the COT from a beginning of a slot in which the COT structure indication is received. In some cases, the base station 105-*a* may provide the COT information via an SFI (e.g., if the UE 115-*a* is not provided with a CO-DurationsPerCell parameter). In such cases, the UE 115-*a* may assume that a duration of the COT is a same duration for which an SFI in DCI format 2_0 is provided.

Additionally or alternatively, the UE 115-*a* may perform validation of CSI-RS based on a grant (e.g., dynamic grant) of resources for a shared channel (e.g., physical downlink shared channel (PDSCH)) or for AP-CSI-RS. For example, if the UE 115-*a* receives a grant of resources (e.g., from the base station 105-*a*) for a downlink shared channel or for AP-CSI-RS, and the resources for the downlink shared channel or AP-CSI-RS overlap with symbols (e.g., time resources, time periods) allocated to the configured P-CSI-RS 215, the UE 115-*a* may monitor for the P-CSI-RS 215 (e.g., may assume that the P-CSI-RS 215 are transmitted by the base station 105-*a*).

In one example, the UE 115-*a* may perform such validation if the UE 115-*a* is configured (e.g., by the base station 105-*a*) to perform CSI-RS validation (e.g., is provided with a csi-RS-ValidationWith-DCI parameter), and if the UE 115-*a* is not configured with either of a channel occupancy configuration (e.g., not provided a CO-DurationsPerCell parameter) or a slot format configuration (e.g., not provided a SlotFormatCombinationsPerCell). In such cases, the UE 115-*a* may be configured to receive P-CSI-RS 215 in a set of symbols of a slot (e.g., configured by the base station 105-*a*), and the UE 115-*a* may refrain from monitoring for the P-CSI-RS 215 (e.g., may cancel reception of the P-CSI-RS 215) if the UE 115-*a* fails to detect a DCI format indicating AP-CSI-RS reception or scheduling a shared channel reception in the set of symbols for the P-CSI-RS 215.

The base station 105-*a* may also transmit one or more SSBs 220 that may be exempt from contention-based procedures (e.g., and may therefore not be subject to an LBT). An SSB 220 may include synchronization signals and/or a physical broadcast channel (PBCH). One or more types of signaling may themselves be exempt from contention-based procedures, may be able to be multiplexed with SSBs 220, or both. SSBs 220, or signals that may be multiplexed with SSBs 220, or both, may in some cases be referred to as short control signaling. Downlink transmissions that may potentially be multiplexed (e.g., time division multiplexed (TDMed) or frequency division multiplexed (FDMed)) with contention-free SSBs 220 may also be transmitted in a contention-free manner when multiplexed with a contention-exempt SSB 220 (e.g., due to the associated SSB 220 being contention-exempt).

For example, the contention-exempt SSB(s) 220 (e.g., synchronization signals and/or PBCH) may be multiplexed with CSI-RS (e.g., P-CSI-RS 215), a remaining minimum system information (RMSI) physical downlink control channel (PDCCH), or a RMSI PDSCH, among other examples. In some cases, the contention-exempt SSB(s) 220 may additionally or alternatively multiplexed with other broadcast PDSCH, a PDSCH without user plane data, a PDCCH, positioning reference signals (PRS), or one or more signals and/or channels included in a discovery burst (e.g., the contention exemption may apply to the discovery burst). A total amount of transmissions or time for the multiplexed signals or multiplexed channels, or both, may also be configured to meet a percentage of time over an interval. For example, the multiplexed signals and/or channels may be less than or equal to ten percent of an interval (e.g., any 100 ms interval).

Some validation techniques for P-CSI-RS 215 may fail to account for contention-exempt SSB(s) 220, which may result in decreased opportunities for the UE 115-*a* to monitor for and receive P-CSI-RS 215. For example, the base station 105-*a* may not transmit short control signaling SSB(s) 220 along with a COT structure indication, an SFI, or a grant, such that the validation rules used by the UE 115-*a* may not be applicable to validate P-CSI-RS 215 that may overlap with the contention-exempt SSB(s) 220. For example, if the base station 105-*a* does not configure a COT, or does not schedule a grant based transmission overlapping with configured P-CSI-RS 215, the UE 115-*a* may determine that the P-CSI-RS 215 are not transmitted by the base station 105-*a*, and may refrain from monitoring for (e.g., and receiving, measuring, and reporting based on) the P-CSI-RS 215.

The present disclosure provides techniques to increase a quantity of time (e.g., communication resources) during which the UE 115-*a* may monitor for P-CSI-RS 215, for example, by accounting for contention-exempt SSBs 220 within one or more P-CSI-RS 215 validation rules (e.g., one or more CSI-RS validation techniques as described herein). For example, if a P-CSI-RS 215 falls within a time frame associated with the contention-exempt SSB(s) 220, the UE 115-*a* may monitor for the P-CSI-RS 215, for example, because the P-CSI-RS 215 may be multiplexed with the one or more contention-exempt SSBs 220. The base station 105-*a* may transmit, to the UE 115-*a*, an indication 210 of the one or more contention-exempt SSBs 220 (e.g., short control signaling SSB(s)), which may be assigned a second set of one or more time periods for transmission.

The UE 115-*a* may determine to monitor for a configured P-CSI-RS 215 if resources assigned to the P-CSI-RS 215 (e.g., one or more of the first set of time periods) fall within a time frame associated with the one or more contention-exempt SSBs 220. Similarly, the base station 105-*a* may transmit configured P-CSI-RS 215 (e.g., multiplexed with the one or more SSBs 220) if resources assigned to the P-CSI-RS 215 (e.g., one or more of the first set of time periods) fall within a time frame associated with the one or more contention-exempt SSBs 220. As described herein, the time frame associated with the one or more contention-exempt SSBs 220 may include a slot for the SSB(s) 220, a symbol used by the SSB(s) 220, symbols between the SSB(s) 220, slots between the SSB(s) 220, or any combination thereof.

In some cases, the base station 105-*a* may operate within a mode that is unassociated with performing contention-based procedures (e.g., is operating in a non-LBT mode), as opposed to operating within a mode associated with performing contention-based procedures. Because CSI-RS validation may not apply to a non-contention-based mode, the UE 115-*a* may be configured to perform the P-CSI-RS validation based on the operating mode (e.g., LBT or non-LBT) of the base station 105-*a*. For example, the base station 105-*a* may transmit an indication to the UE 115-*a* (e.g., via system information, via radio resource control (RRC) signaling), indicating whether the base station 105-*a* is operating in a contention-based mode, or outside of a contention-based mode.

If the base station 105-*a* is operating outside of the contention-based mode, the UE 115-*a* may refrain from performing CSI-RS validation (e.g., for the configured P-CSI-RS 215) and may determine (e.g., assume) that all P-CSI-RS are transmitted by the base station 105-*a*. Similarly, if the base station 105-*a* is operating in the contention-based mode, the UE 115-*a* may perform CSI-RS validation (e.g., for the configured P-CSI-RS 215).

Figure 3A:
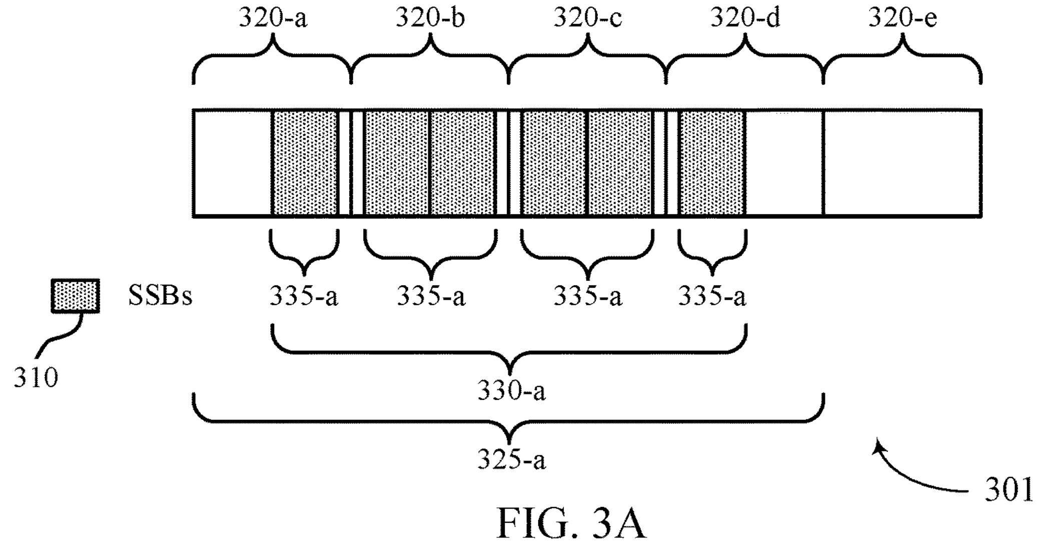
FIGS. 3A, 3B, and 3C illustrate examples of signaling schemes that support validating CSI-RS in accordance with aspects of the present disclosure.
Figure 3B:
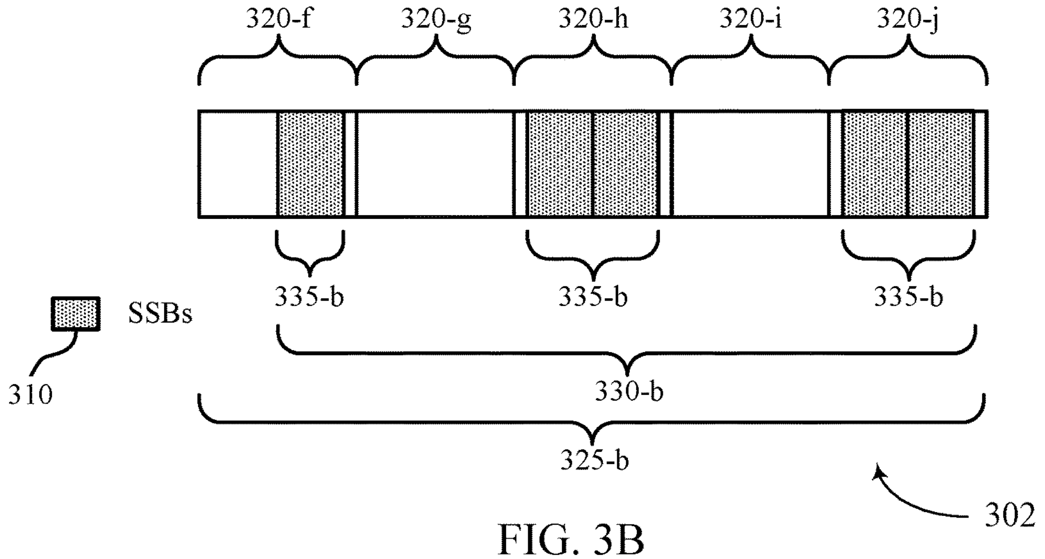
Figure 3C:
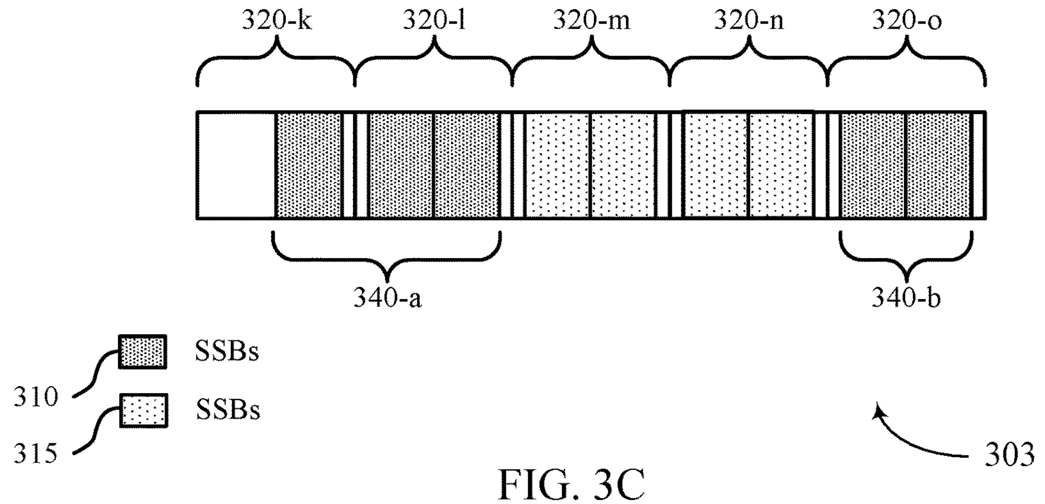

FIGS. 3A, 3B, and 3C illustrate examples of signaling schemes 301, 302, and 303 that support validating CSI-RS in accordance with aspects of the present disclosure. Signaling schemes 301, 302, and 303 may implement or be implemented by one or more aspects of wireless communications system 100 or 200. For example, signaling schemes 301, 302, and 303 may be implemented by a base station 105 and a UE 115, which may be examples of a base station 105 and a UE 115 as described with reference to FIGS. 1 and 2. The base station 105 and the UE 115 may implement one or more aspects of signaling schemes 301, 302, and 303, for example, to respectively transmit or validate P-CSI-RS, as described with reference to FIG. 2.

For example, as described with reference to FIG. 2, the base station 105 may configure the UE 115 with a set of P-CSI-RS, and a set of associated time periods (e.g., one or more first time periods) over which P-CSI-RS of the set are to be transmitted. The base station 105 may also transmit, to the UE 115, an indication of one or more SSBs 310, which may be exempt from contention-based procedures (e.g., the base station 105 may transmit the one or more SSBs 310 without first performing a contention-based procedure, such as an LBT). The base station 105 may indicate, for example, a set of time periods (e.g., one or more second time periods) over which the one or more SSBs 310 are to be transmitted. The time periods may be represented by slots 320 and/or symbols for transmission of the SSB(s) 310.

In some cases, as illustrated by FIG. 3A, SSBs 310 may be transmitted in consecutive slots (e.g., at least one SSB 310 may be transmitted in each slot 320 from slot 320-*a* through 320-*d*). In some cases, as illustrated by FIG. 3B, SSBs 310 may be transmitted in non-consecutive slots 320 (e.g., at least one SSB 310 may be transmitted in each of slots 320-*f*, 320-*h*, and 320-*j*). In some cases, as illustrated by FIG. 3C, contention-exempt SSBs 310 may be transmitted in an alternating manner with one or more contention-based SSBs 315. For example, a first set of contention-exempt SSBs 310 may be transmitted in slots 320-*k* and 320-*l*, a set of contention-based SSBs 315 may be transmitted in slots 320-*m* and 320-*n*, and a second set of contention-exempt SSBs 310 may be transmitted in slot 320-*o*. It is to be understood that the examples described herein are merely illustrative, and that the same examples may be applied to any structure or pattern of contention-exempt SSBs 310, as well as any structure or pattern of contention-exempt SSBs 310 and contention-based SSBs 315.

Based on the time periods allocated to transmission of the P-CSI-RS and the SSB(s) 310, the UE 115 and the base station 105 may determine whether P-CSI-RS are to be transmitted using one or more of the configured first time periods (e.g., the UE 115 may perform CSI-RS validation and the base station 105 may determine whether to transmit the P-CSI-RS). For example, the base station 105 may determine whether to transmit the P-CSI-RS in one or more first time periods based on the time periods allocated to transmission of the P-CSI-RS and the SSB(s) 310, and the UE 115 may determine whether to monitor for the P-CSI-RS in one or more first time periods based on performing the CSI-RS validation. As described with reference to FIG. 2, the base station 105 and the UE 115 may determine that P-CSI-RS are to be transmitted if the P-CSI-RS overlap with one or more respective second time periods (e.g., used for or associated with transmission of the SSB(s) 310).

In a first example, the one or more second time periods may include any slot 320 used for transmission of an SSB 310. In such cases, the UE 115 and the base station 105 may determine that the P-CSI-RS are to be transmitted within any slot 320 in which an SSB 310 is transmitted. For example, the UE 115 may validate and the base station 105 may transmit any P-CSI-RS in slots 320-*a*, 320-*b*, 320-*c*, and 320-*d* of FIG. 3A or any P-CSI-RS in slots 320-*f*, 320-*h*, and 320-*j* of FIG. 3B (e.g., any P-CSI-RS having first time periods allocated within one or more of the slots 320). In some cases, all P-CSI-RS within a span from a first SSB 310 to a last SSB 310 included in a short control signaling transmission (e.g., as indicated by the base station 105) may be validated. For example, the UE 115 may validate and the base station 105 may transmit any P-CSI-RS in slots 320-*a* through 320-*d* of FIG. 3A or any P-CSI-RS in slots 320-*f* through 320-*j* of FIG. 3B (e.g., including slots 320-*g* and 320-*i*). As such, any P-CSI-RS scheduled to be transmitted within a time period 325-*a* of FIG. 3A, or a time period 325-*b* of FIG. 3B, may be validated by the UE 115 and transmitted by the base station 105.

In a second example, the one or more second time periods may include any symbols within the span from a first SSB 310 to a last SSB 310 included in a short control signaling transmission (e.g., as indicated by the base station 105). In such cases, the UE 115 and the base station 105 may determine that the P-CSI-RS are to be transmitted within any symbols in which an SSB 310 is transmitted, as well as any symbols between SSBs 310. For example, any P-CSI-RS scheduled to be transmitted within a time period 330-*a* of FIG. 3A, or a time period 330-*b* of FIG. 3B, may be validated by the UE 115 and transmitted by the base station 105.

In a third example, the one or more second time periods may include the symbols of any SSB 310 included in a short control signaling transmission (e.g., as indicated by the base station 105). In such cases, the UE 115 and the base station 105 may determine that the P-CSI-RS are to be transmitted within any symbols in which an SSB 310 is transmitted, but not symbols between SSBs 310. For example, any P-CSI-RS scheduled to be transmitted within a set of time periods 335-*a* of FIG. 3A, or a set of time periods 335-*b* of FIG. 3B, may be validated by the UE 115 and transmitted by the base station 105.

In some cases, as illustrated by FIG. 3C, contention-exempt SSBs 310 (e.g., short control signaling based SSB transmissions) may be transmitted over multiple bursts 340 (e.g., may include multiple short control signaling transmissions). In such cases, the P-CSI-RS may be validated independently in each burst 340. For example, the base station 105 may transmit signaling to the UE 115 indicating a first burst 340-*a* (e.g., first set) of SSBs 310 and a second burst 340-*b* (e.g., second set) of SSBs 310, which may be separated by one or more SSBs 315. In such cases, the UE 115 may apply one or more CSI-RS validation rules (e.g., as described in the first, second, or third, examples with reference to FIGS. 3A and 3B) to the first burst 340-*a* of SSBs 310, and may independently apply the one or more CSI-RS validation rules to the second burst 340-*b* of SSBs 310 (e.g., because one or more contention-based SSBs 315 intervene between the two sets of contention-exempt SSBs 310).

Based on performing the one or more validation procedures described herein, the UE 115 may determine to monitor for a subset of the configured P-CSI-RS if the P-CSI-RS overlap with a second time period associated with the SSBs 310. Similarly, the base station 105 may determine to transmit a subset of the configured P-CSI-RS if the P-CSI-RS overlap with a second time period associated with the SSBs 310.

Figure 4:
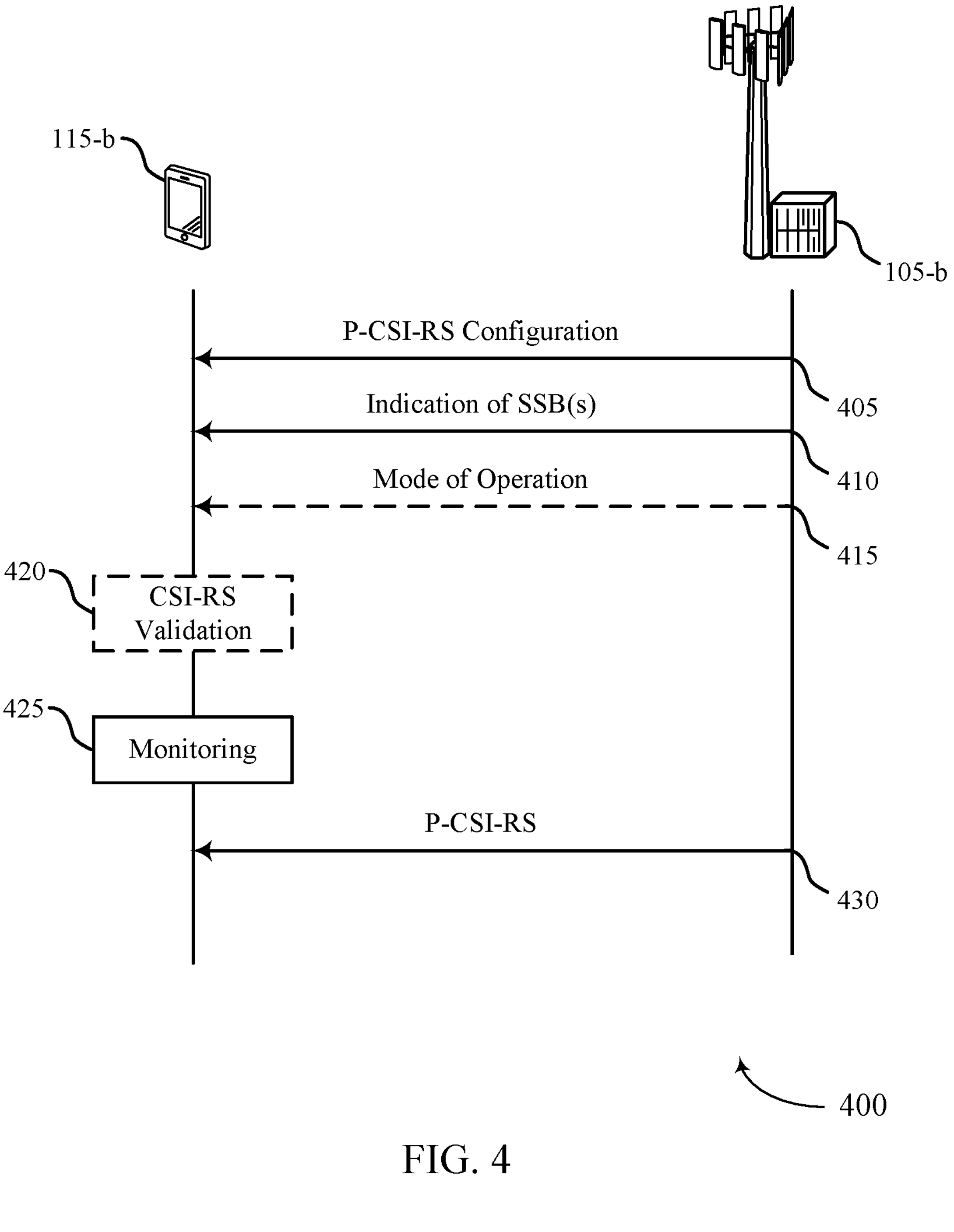
FIG. 4 illustrates an example of a process flow that supports validating CSI-RS in accordance with aspects of the present disclosure.

FIG. 4 illustrates an example of a process flow 400 that supports validating CSI-RS in accordance with aspects of the present disclosure. Some aspects of process flow 400 may implement or be implemented by one or more aspects of wireless communications system 100 or 200, as well as signaling schemes 301, 302, and 303. For example, process flow 400 may be implemented by a the base station 105-*b* and a the UE 115-*b*, which may be examples of a base station 105 and a UE 115 described with reference to FIGS. 1-3. The base station 105-*b* and the UE 115-*b* may implement process flow 400 in order to respectively transmit or validate one or more CSI-RS, as described herein.

In the following description of process flow 400, the operations may be performed in a different order than the order shown, or the operations performed by the UE 115-*b* and the base station 105-*b* may be performed in different orders or at different times. For example, some operations may also be left out of process flow 400, or other operations may be added to process flow 400. As another example, operations shown as performed in a single instance (e.g., a single transmission) may in some cases be performed as multiple instances (e.g., multiple transmissions) over some duration of time, or multiple transmissions may be combined into a single transmission instance. Although the UE 115-*b* and the base station 105-*b* are shown performing the operations of process flow 400, some aspects of some operations may also be performed by one or more other wireless devices.

At 405, the base station 105-*b* may transmit, to the UE 115-*b*, control signaling indicating a configuration of P-CSI-RS, where one or more first time periods may be allocated to the P-CSI-RS. For example, as described with reference to FIG. 2, the base station 105-*b* may transmit an indication of a pattern or resource allocation for the P-CSI-RS, where the pattern or the resource allocation may include the one or more first time periods.

At 410, the base station 105-*b* may transmit, to the UE 115-*b*, an indication of one or more SSBs that are exempt from contention-based procedures, where one or more second time periods may be allocated to the one or more SSBs. In a first example, the base station 105-*b* may indicate the one or more SSBs by indicating a set of SSB indices to be transmitted using short control signaling. In a second example, the base station 105-*b* may indicate the one or more SSBs by indicating a starting SSB index and a quantity of continuous SSB indices to be transmitted using short control signaling. Such signaling may support multiple bursts, or sets, of the one or more SSBs, for example, by indicating multiple starting SSB indices and a corresponding quantity of SSBs for each starting SSB index. In a third example, the base station 105-*b* may indicate the one or more SSBs by indicating a starting time and a duration for the one or more SSBs, where each SSBs in the indicated duration may be based on a short control signaling transmission. Such signaling may support multiple bursts, or sets, of the one or more SSBs, for example, by indicating multiple starting times and a corresponding time duration for each starting time.

At 415, the base station 105-*b* may transmit, to the UE 115-*b*, an indication of a mode of operation of the base station 105-*b*. The mode of operation may correspond to whether transmissions to the UE 115-*b*, from the base station 105-*b*, are contention-based. For example, the base station 105-*b* may indicate whether the base station 105-*b* is operating in an LBT mode or a non-LBT mode.

At 420, the UE 115-*b* may perform CSI-RS validation based on the one or more indicated SSBs and the configured P-CSI-RS. In some cases, the UE 115-*b* may perform the CSI-RS validation based on the mode of operation of the base station 105-*b* being contention-based (e.g., transmissions from the base station 105-*b* to the UE 115-*b* are contention-based). The UE 115-*b* may perform the CSI-RS validation according to one or more examples described herein, such as with reference to FIGS. 3A, 3B, and 3C (e.g., among other examples). In some cases, after performing the CSI-RS validation based on the one or more SSBs, the UE 115-*b* may perform CSI-RS validation based on a COT, or a resource grant, as described herein.

When performing the validation based on the one or more SSBs, the UE 115-*b* may validate any P-CSI-RS that is configured for transmission in a first time period that overlaps with a second time period for transmission of an SSB of the one or more SSBs. In some cases, a second time period may represent a slot for transmission of the SSB, a slot between SSB transmissions, a symbol used for transmission of the SSB, or a symbol between SSB transmissions. Any first time period in which a P-CSI-RS is validated may additionally be referred to herein as a third time period.

At 425, the UE 115-*b* may monitor for the P-CSI-RS within one or more third time periods that each include at least a respective portion of the one or more first time periods (e.g., based on performing the CSI-RS validation). The one or more third time periods may, for example, be based on an overlap between the one or more second time periods and the one or more first time periods (e.g., as determined when performing the CSI-RS validation).

At 430, the base station 105-*b* may transmit one or more P-CSI-RS within one or more third time periods that each include at least a respective portion of the one or more first time periods (e.g., based on determining whether to transmit the CSI-RS). As described herein, the one or more third time periods may be based on an overlap between the one or more second time periods and the one or more first time periods (e.g., as determined based on the respective allocated or configured time periods). In some cases, each of the one or more P-CSI-RS may be multiplexed (e.g., FDMed or TDMed) with a respective SSB of the one or more SSBs.

Figure 5:
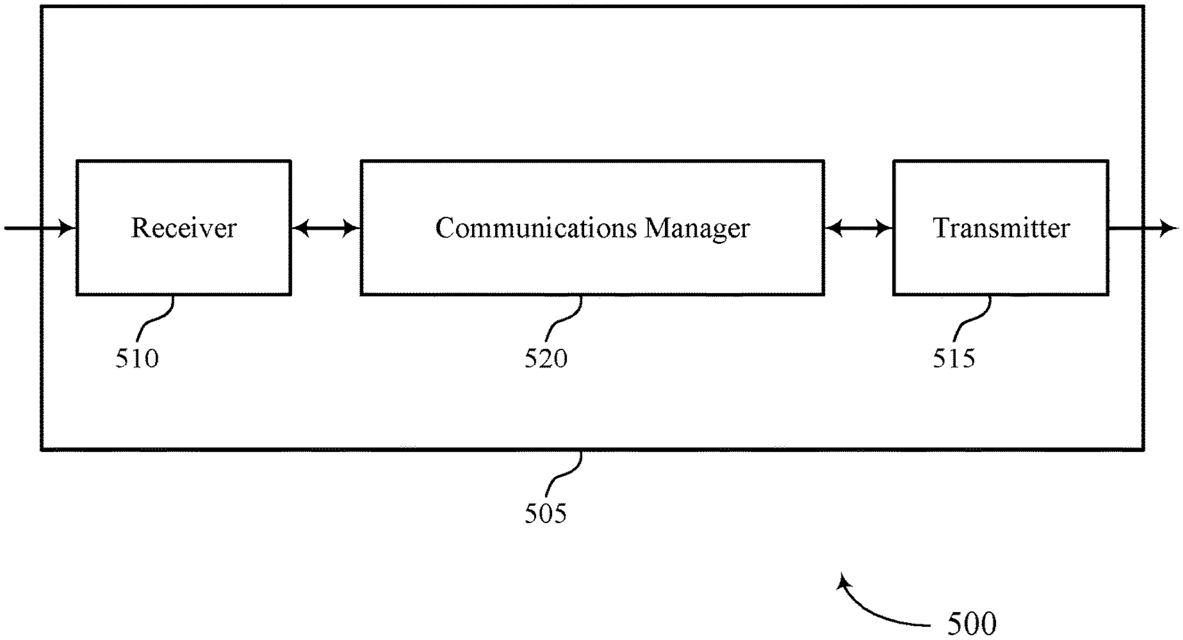
FIGS. 5 and 6 show block diagrams of devices that support validating CSI-RS in accordance with aspects of the present disclosure.

FIG. 5 shows a block diagram 500 of a device 505 that supports validating CSI-RS in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to validating CSI-RS). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to validating CSI-RS). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of validating CSI-RS as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, control signaling indicating a configuration of P-CSI-RS, where one or more first time periods are allocated to the P-CSI-RS. The communications manager 520 may be configured as or otherwise support a means for receiving an indication of one or more SSBs that are exempt from contention-based procedures, where one or more second time periods are allocated to the one or more SSBs that are exempt from contention-based procedures. The communications manager 520 may be configured as or otherwise support a means for monitoring for the P-CSI-RS within one or more third time periods that each include at least a respective portion of the one or more first time periods, where the one or more third time periods are based on an overlap between the one or more second time periods and the one or more first time periods.

The actions performed by the communications manager 520, among other examples herein, may be implemented to realize one or more potential advantages. For example, communications manager 520 may increase available battery power and communication quality at a wireless device (e.g., a UE 115) by supporting validation of CSI-RS based on one or more rules that account for contention-exempt SSBs. The associated increase in communication quality may result in increased link performance and decreased overhead based on applying the one or more rules when validating CSI-RS in a contention-based mode. Accordingly, communications manager 520 may save power and increase battery life at a wireless device (e.g., a UE 115) by strategically increasing a quality of communications at a wireless device (e.g., a UE 115).

Figure 6:
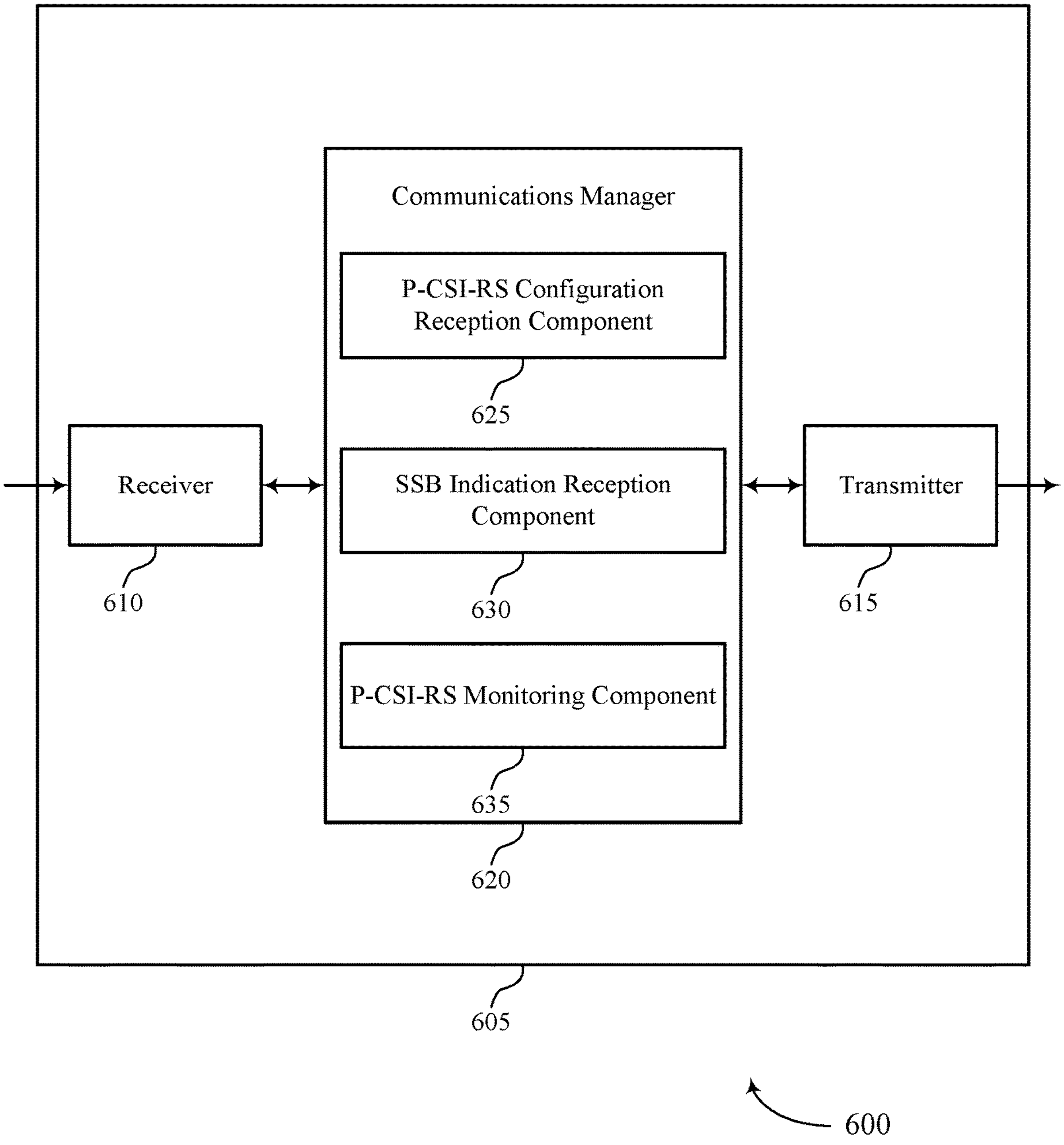

FIG. 6 shows a block diagram 600 of a device 605 that supports validating CSI-RS in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to validating CSI-RS). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to validating CSI-RS). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of validating CSI-RS as described herein. For example, the communications manager 620 may include a P-CSI-RS configuration reception component 625, an SSB indication reception component 630, a P-CSI-RS monitoring component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The P-CSI-RS configuration reception component 625 may be configured as or otherwise support a means for receiving, from a base station, control signaling indicating a configuration of P-CSI-RS, where one or more first time periods are allocated to the P-CSI-RS. The SSB indication reception component 630 may be configured as or otherwise support a means for receiving an indication of one or more SSBs that are exempt from contention-based procedures, where one or more second time periods are allocated to the one or more SSBs that are exempt from contention-based procedures. The P-CSI-RS monitoring component 635 may be configured as or otherwise support a means for monitoring for the P-CSI-RS within one or more third time periods that each include at least a respective portion of the one or more first time periods, where the one or more third time periods are based on an overlap between the one or more second time periods and the one or more first time periods.

A processor of a wireless device (e.g., controlling the receiver 610, the transmitter 615, or the transceiver 815 as described with reference to FIG. 8) may increase available battery power and communication quality. The increased communication quality may increase available battery power and throughput (e.g., via implementation of system components described with reference to FIG. 7) compared to other systems and techniques, for example, that do not support validation of CSI-RS based on one or more rules that account for contention-exempt SSBs. Further, the processor of the wireless device may identify one or more aspects (e.g., parameters) of the one or more validation rules, which may result in increased communication quality, as well as save power and increase battery life at the wireless device (e.g., by strategically supporting a higher quantity of validated CSI-RS), among other benefits.

Figure 7:
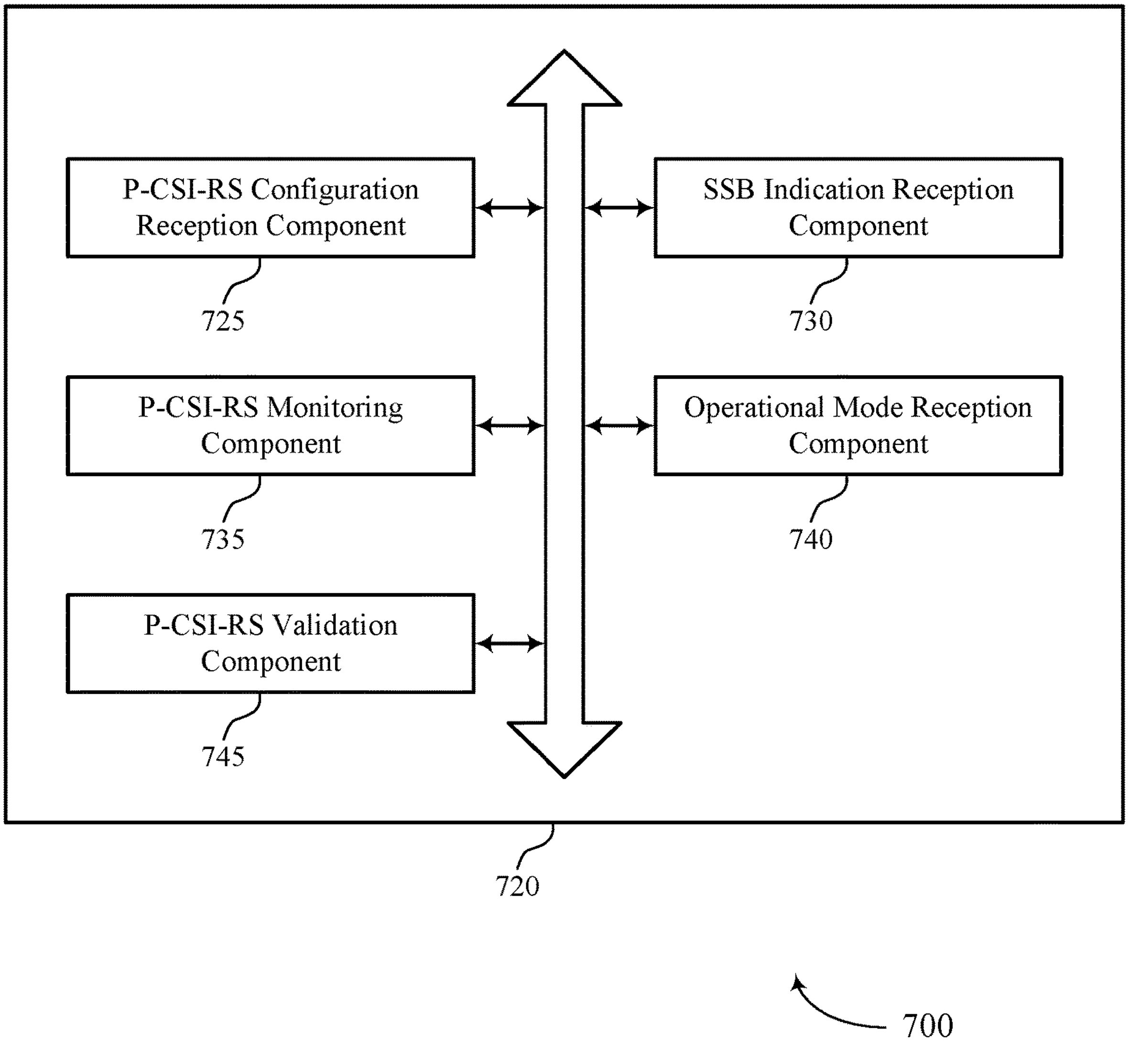
FIG. 7 shows a block diagram of a communications manager that supports validating CSI-RS in accordance with aspects of the present disclosure.

FIG. 7 shows a block diagram 700 of a communications manager 720 that supports validating CSI-RS in accordance with aspects of the present disclosure. The communications manager 720 may be an example of aspects of a communications manager 520, a communications manager 620, or both, as described herein. The communications manager 720, or various components thereof, may be an example of means for performing various aspects of validating CSI-RS as described herein. For example, the communications manager 720 may include a P-CSI-RS configuration reception component 725, an SSB indication reception component 730, a P-CSI-RS monitoring component 735, an operational mode reception component 740, a P-CSI-RS validation component 745, or any combination thereof. Each of these components may communicate, directly or indirectly, with one another (e.g., via one or more buses).

The communications manager 720 may support wireless communication at a UE in accordance with examples as disclosed herein. The P-CSI-RS configuration reception component 725 may be configured as or otherwise support a means for receiving, from a base station, control signaling indicating a configuration of P-CSI-RS, where one or more first time periods are allocated to the P-CSI-RS. The SSB indication reception component 730 may be configured as or otherwise support a means for receiving an indication of one or more SSBs that are exempt from contention-based procedures, where one or more second time periods are allocated to the one or more SSBs that are exempt from contention-based procedures. The P-CSI-RS monitoring component 735 may be configured as or otherwise support a means for monitoring for the P-CSI-RS within one or more third time periods that each include at least a respective portion of the one or more first time periods, where the one or more third time periods are based on an overlap between the one or more second time periods and the one or more first time periods.

In some examples, the operational mode reception component 740 may be configured as or otherwise support a means for receiving an indication of a mode of operation of the base station, the mode of operation corresponding to whether transmissions to the UE from the base station are contention-based. In some examples, the operational mode reception component 740 may be configured as or otherwise support a means for determining to monitor for the P-CSI-RS within the one or more third time periods based on the mode of operation corresponding to transmissions to the UE from the base station being contention-based.

In some examples, the P-CSI-RS validation component 745 may be configured as or otherwise support a means for determining that a subset of the one or more first time periods overlap with a subset of the one or more second time periods, where monitoring for the P-CSI-RS within the one or more third time periods is based on the determining, and where the one or more third time periods include the subset of the one or more first time periods. In some examples, the P-CSI-RS validation component 745 may be configured as or otherwise support a means for determining whether to monitor for the P-CSI-RS in a subset of the one or more first time periods different from the one or more third time periods based on a COT of the base station, a grant of resources for a downlink shared channel, a grant of resources for AP-CSI-RS, or any combination thereof.

In some examples, the one or more second time periods include a set of slots, at least one SSB of the one or more SSBs transmitted in each slot of the set of slots. In some examples, the one or more second time periods further include one or more slots exclusive of the one or more SSBs, the one or more slots intervening between a first slot and a second slot of the set of slots, the first slot associated with a first SSB of the one or more SSBs and the second slot associated with a second SSB of the one or more SSBs. In some examples, the one or more second time periods include a starting symbol of a first SSB of the one or more SSBs, an ending symbol of a second SSB of the one or more SSBs, and any intervening symbols between the starting symbol of the first SSB and the ending symbol of the second SSB. In some examples, the one or more second time periods include symbols occupied by the one or more SSBs.

In some examples, the P-CSI-RS configuration reception component 725 may be configured as or otherwise support a means for receiving an indication of one or more second SSBs that are exempt from the contention-based procedures, where one or more fourth time periods are allocated to the one or more second SSBs, and where a set of SSBs to which the contention-based procedures apply intervene between the one or more SSBs and the one or more second SSBs. In some examples, the SSB indication reception component

730 may be configured as or otherwise support a means for monitoring for the P-CSI-RS within one or more fifth time periods that each include at least a respective portion of the one or more first time periods, where the one or more fifth time periods are based on an overlap between the one or more fourth time periods and the one or more first time periods.

In some examples, one or more slots intervene between a first slot associated with a first SSB of the one or more SSBs and a second slot associated with a second SSB of the one or more SSBs, the one or more slots exclusive of the one or more SSBs. In some examples, the P-CSI-RS are multiplexed with at least one of the one or more SSBs over the one or more third time periods.

In some examples, to support receiving the indication of the one or more SSBs, the SSB indication reception component 730 may be configured as or otherwise support a means for receiving an indication of a set of indices corresponding to the one or more SSBs. In some examples, to support receiving the indication of the one or more SSBs, the SSB indication reception component 730 may be configured as or otherwise support a means for receiving an indication of a starting index of the one or more SSBs and a quantity of SSBs included in the one or more SSBs. In some examples, to support receiving the indication of the one or more SSBs, the SSB indication reception component 730 may be configured as or otherwise support a means for receiving a starting time and a time duration for transmission of the one or more SSBs. In some examples, to support receiving the indication of the one or more SSBs, the SSB indication reception component 730 may be configured as or otherwise support a means for any combination thereof.

Figure 8:
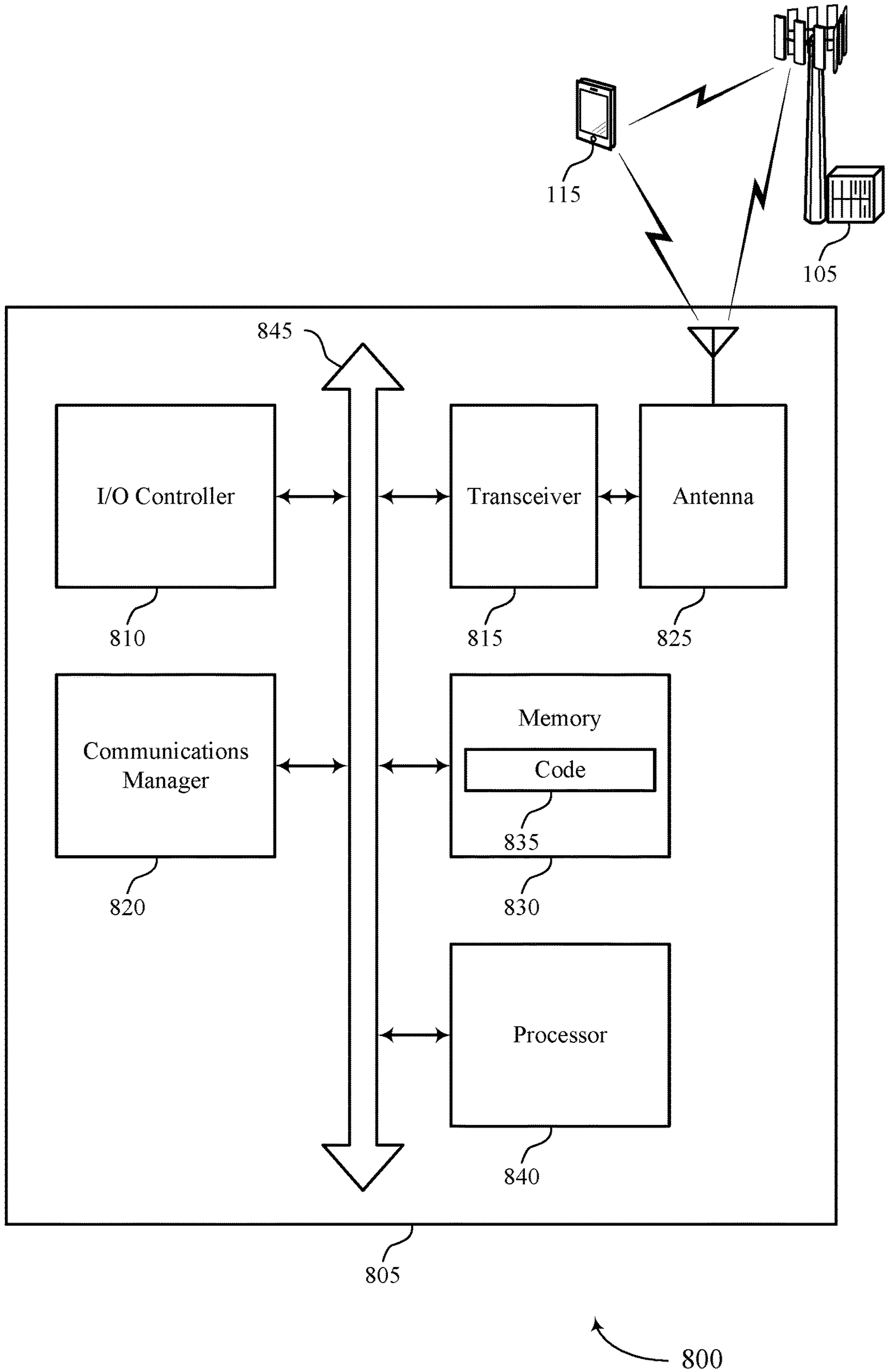
FIG. 8 shows a diagram of a system including a device that supports validating CSI-RS in accordance with aspects of the present disclosure.

FIG. 8 shows a diagram of a system 800 including a device 805 that supports validating CSI-RS in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting validating CSI-RS). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, control signaling indicating a configuration of P-CSI-RS, where one or more first time periods are allocated to the P-CSI-RS. The communications manager 820 may be configured as or otherwise support a means for receiving an indication of one or more SSBs that are exempt from contention-based procedures, where one or more second time periods are allocated to the one or more SSBs that are exempt from contention-based procedures. The communications manager 820 may be configured as or otherwise support a means for monitoring for the P-CSI-RS within one or more third time periods that each include at least a respective portion of the one or more first time periods, where the one or more third time periods are based on an overlap between the one or more second time periods and the one or more first time periods.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of validating CSI-RS as described herein, or the processor 840 and the memory 830 may be otherwise configured to perform or support such operations.

Figure 9:
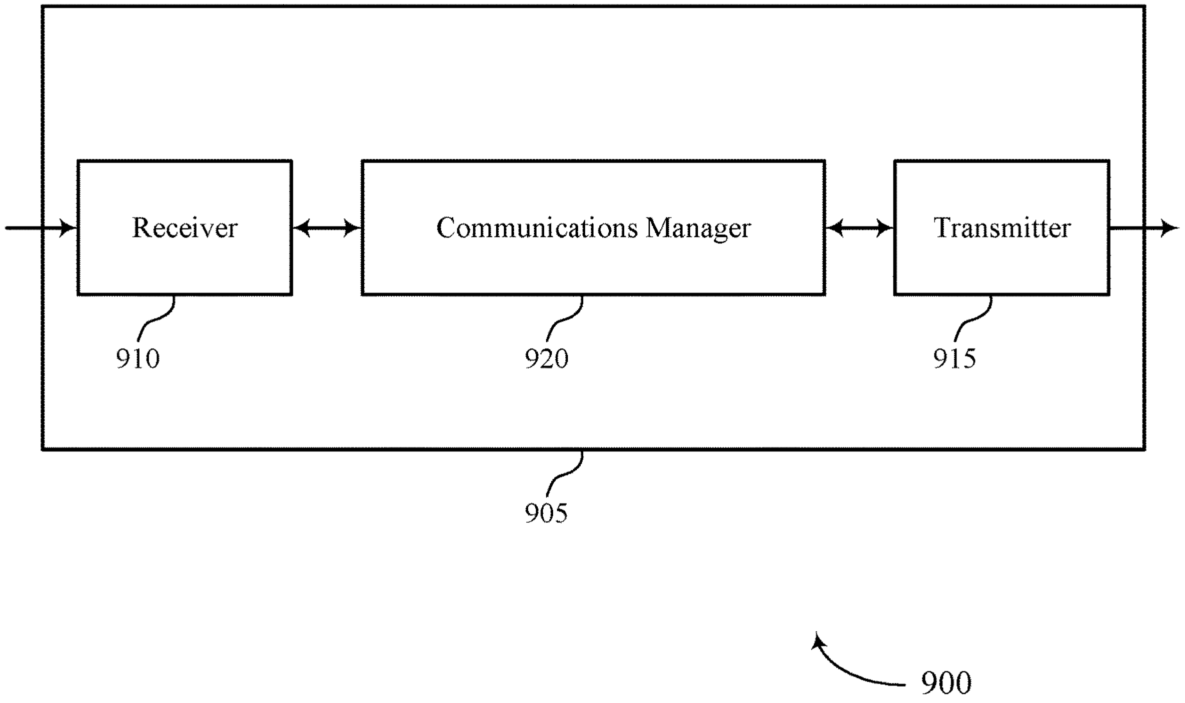
FIGS. 9 and 10 show block diagrams of devices that support validating CSI-RS in accordance with aspects of the present disclosure.

FIG. 9 shows a block diagram 900 of a device 905 that supports validating CSI-RS in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to validating CSI-RS). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to validating CSI-RS). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of validating CSI-RS as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, control signaling indicating a configuration of P-CSI-RS, where one or more first time periods are allocated to the P-CSI-RS. The communications manager 920 may be configured as or otherwise support a means for transmitting, to the UE, an indication of one or more SSBs that are exempt from contention-based procedures, where one or more second time periods are allocated to the one or more SSBs that are exempt from contention-based procedures. The communications manager 920 may be configured as or otherwise support a means for transmitting the P-CSI-RS within one or more third time periods that each include at least a respective portion of the one or more first time periods, where the one or more third time periods are based on an overlap between the one or more second time periods and the one or more first time periods.

Figure 10:
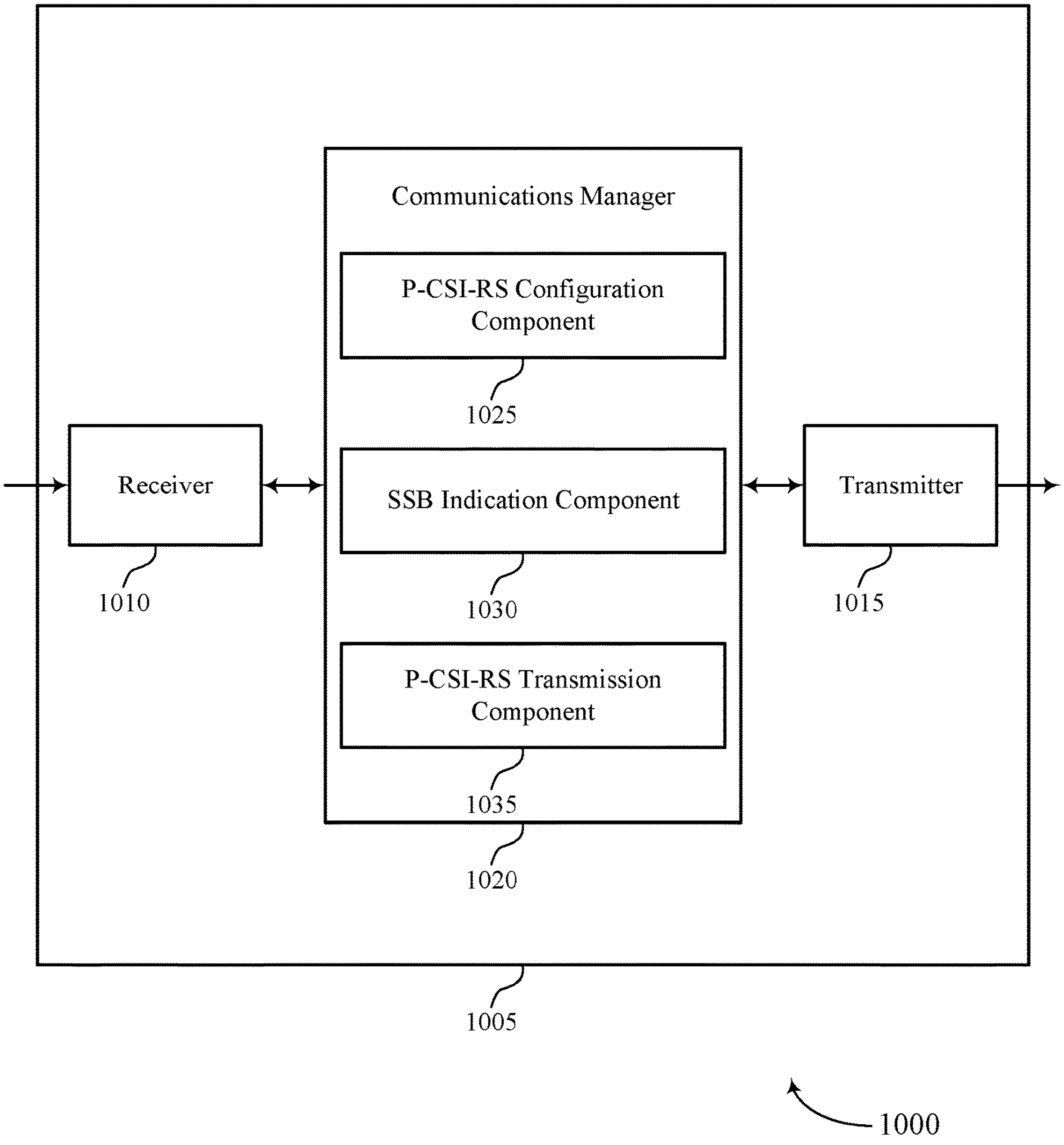

FIG. 10 shows a block diagram 1000 of a device 1005 that supports validating CSI-RS in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to validating CSI-RS). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to validating CSI-RS). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of validating CSI-RS as described herein. For example, the communications manager 1020 may include a P-CSI-RS configuration component 1025, an SSB indication component 1030, a P-CSI-RS transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The P-CSI-RS configuration component 1025 may be configured as or otherwise support a means for transmitting, to a UE, control signaling indicating a configuration of P-CSI-RS, where one or more first time periods are allocated to the P-CSI-RS. The SSB indication component 1030 may be configured as or otherwise support a means for transmitting, to the UE, an indication of one or more SSBs that are exempt from contention-based procedures, where one or more second time periods are allocated to the one or more SSBs that are exempt from contention-based procedures. The P-CSI-RS transmission component 1035 may be configured as or otherwise support a means for transmitting the P-CSI-RS within one or more third time periods that each include at least a respective portion of the one or more first time periods, where the one or more third time periods are based on an overlap between the one or more second time periods and the one or more first time periods.

Figure 11:
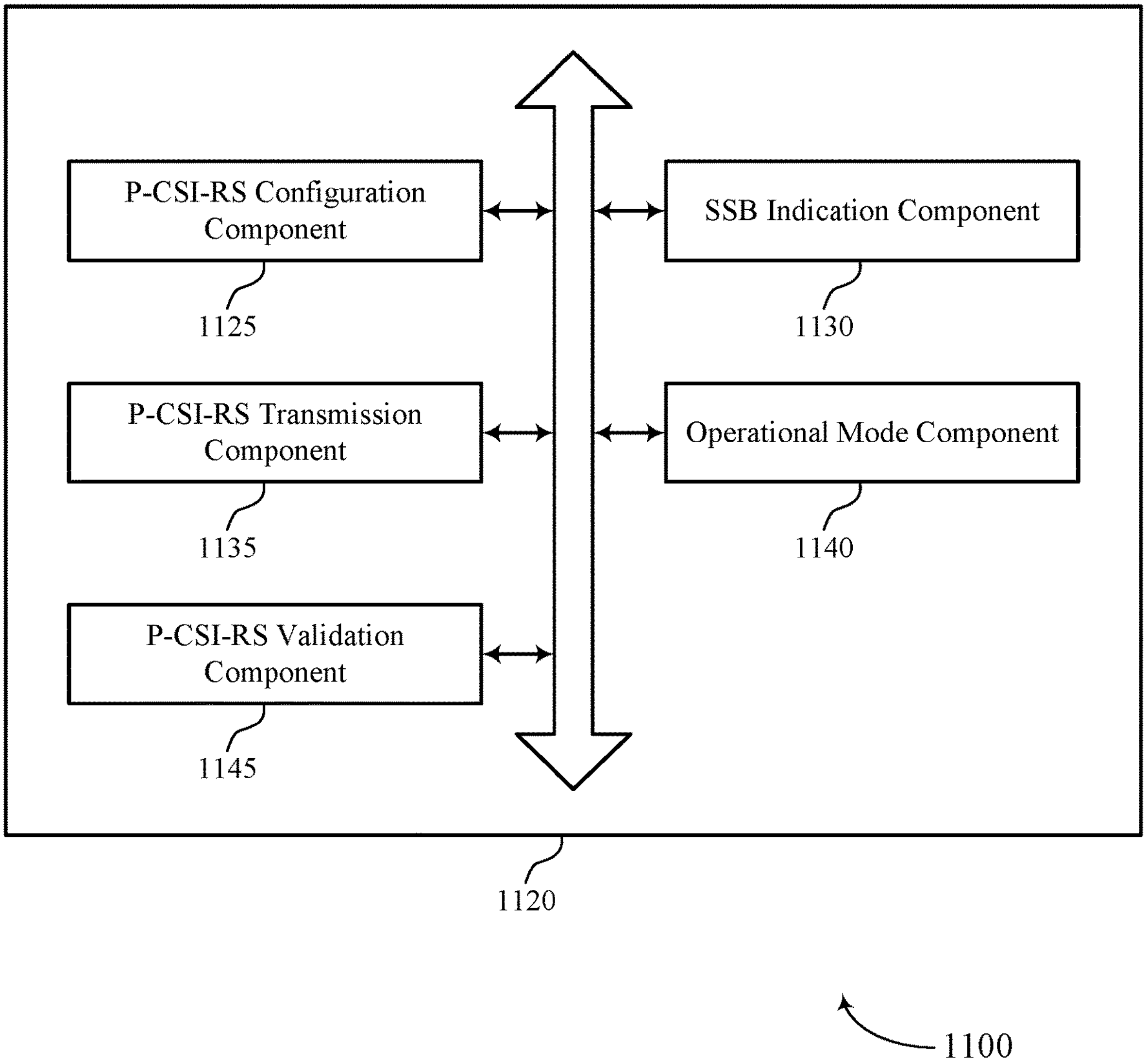
FIG. 11 shows a block diagram of a communications manager that supports validating CSI-RS in accordance with aspects of the present disclosure.

FIG. 11 shows a block diagram 1100 of a communications manager 1120 that supports validating CSI-RS in accordance with aspects of the present disclosure. The communications manager 1120 may be an example of aspects of a communications manager 920, a communications manager 1020, or both, as described herein. The communications manager 1120, or various components thereof, may be an example of means for performing various aspects of validating CSI-RS as described herein. For example, the communications manager 1120 may include a P-CSI-RS configuration component 1125, an SSB indication component 1130, a P-CSI-RS transmission component 1135, an operational mode component 1140, a P-CSI-RS validation component 1145, or any combination thereof. Each of these components may communicate, directly or indirectly, with one another (e.g., via one or more buses).

The communications manager 1120 may support wireless communication at a base station in accordance with examples as disclosed herein. The P-CSI-RS configuration component 1125 may be configured as or otherwise support a means for transmitting, to a UE, control signaling indicating a configuration of P-CSI-RS, where one or more first time periods are allocated to the P-CSI-RS. The SSB indication component 1130 may be configured as or otherwise support a means for transmitting, to the UE, an indication of one or more SSBs that are exempt from contention-based procedures, where one or more second time periods are allocated to the one or more SSBs that are exempt from contention-based procedures. The P-CSI-RS transmission component 1135 may be configured as or otherwise support a means for transmitting the P-CSI-RS within one or more third time periods that each include at least a respective portion of the one or more first time periods, where the one or more third time periods are based on an overlap between the one or more second time periods and the one or more first time periods.

In some examples, the operational mode component 1140 may be configured as or otherwise support a means for transmitting an indication of a mode of operation of the base station, the mode of operation corresponding to whether transmissions to the UE from the base station are contention-based. In some examples, the operational mode component 1140 may be configured as or otherwise support a means for transmitting the P-CSI-RS within the one or more third time periods based on the mode of operation corresponding to transmissions to the UE from the base station being contention-based.

In some examples, the P-CSI-RS validation component 1145 may be configured as or otherwise support a means for determining that a subset of the one or more first time periods overlap with a subset of the one or more second time periods, where transmitting the P-CSI-RS within the one or more third time periods is based on the determining, and where the one or more third time periods include the subset of the one or more first time periods. In some examples, the P-CSI-RS validation component 1145 may be configured as or otherwise support a means for determining whether to transmit the P-CSI-RS in a subset of the one or more first time periods different from the one or more third time periods based on a COT of the base station, a grant of resources for a downlink shared channel, a grant of resources for AP-CSI-RS, or any combination thereof.

In some examples, the one or more second time periods include a set of slots, at least one SSB of the one or more SSBs transmitted in each slot of the set of slots. In some examples, the one or more second time periods further include one or more slots exclusive of the one or more SSBs, the one or more slots intervening between a first slot and a second slot of the set of slots, the first slot associated with a first SSB of the one or more SSBs and the second slot associated with a second SSB of the one or more SSBs. In some examples, the one or more second time periods include a starting symbol of a first SSB of the one or more SSBs, an ending symbol of a second SSB of the one or more SSBs, and any intervening symbols between the starting symbol of the first SSB and the ending symbol of the second SSB. In some examples, the one or more second time periods include symbols occupied by the one or more SSBs.

In some examples, the P-CSI-RS configuration component 1125 may be configured as or otherwise support a means for transmitting an indication of one or more second SSBs that are exempt from the contention-based procedures, where one or more fourth time periods are allocated to the one or more second SSBs, and where a set of SSBs to which the contention-based procedures apply intervene between the one or more SSBs and the one or more second SSBs. In some examples, the SSB indication component 1130 may be configured as or otherwise support a means for transmitting the P-CSI-RS within one or more fifth time periods that each include at least a respective portion of the one or more first time periods, where the one or more fifth time periods are based on an overlap between the one or more fourth time periods and the one or more first time periods.

In some examples, one or more slots intervene between a first slot associated with a first SSB of the one or more SSBs and a second slot associated with a second SSB of the one or more SSBs, the one or more slots exclusive of the one or more SSBs.

In some examples, to support transmitting the P-CSI-RS, the P-CSI-RS transmission component 1135 may be configured as or otherwise support a means for multiplexing the P-CSI-RS with at least one of the one or more SSBs over the one or more third time periods.

In some examples, to support transmitting the indication of the one or more SSBs, the SSB indication component 1130 may be configured as or otherwise support a means for transmitting an indication of a set of indices corresponding to the one or more SSBs. In some examples, to support transmitting the indication of the one or more SSBs, the SSB indication component 1130 may be configured as or otherwise support a means for transmitting an indication of a starting index of the one or more SSBs and a quantity of SSBs included in the one or more SSBs. In some examples, to support transmitting the indication of the one or more SSBs, the SSB indication component 1130 may be configured as or otherwise support a means for transmitting a starting time and a time duration for transmission of the one or more SSBs. In some examples, to support transmitting the indication of the one or more SSBs, the SSB indication component 1130 may be configured as or otherwise support a means for any combination thereof.

Figure 12:
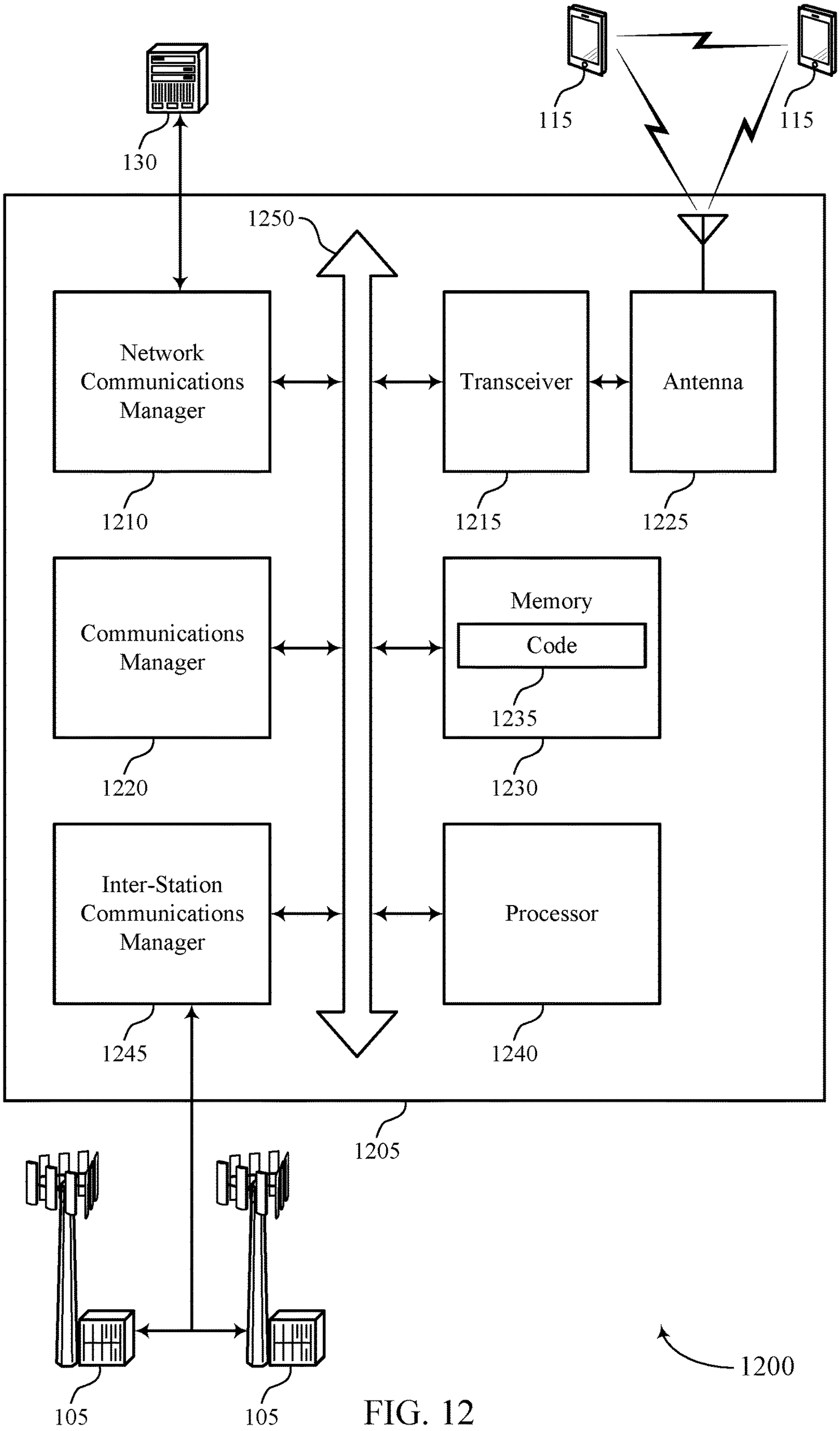
FIG. 12 shows a diagram of a system including a device that supports validating CSI-RS in accordance with aspects of the present disclosure.

FIG. 12 shows a diagram of a system 1200 including a device 1205 that supports validating CSI-RS in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting validating CSI-RS). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, control signaling indicating a configuration of P-CSI-RS, where one or more first time periods are allocated to the P-CSI-RS. The communications manager 1220 may be configured as or otherwise support a means for transmitting, to the UE, an indication of one or more SSBs that are exempt from contention-based procedures, where one or more second time periods are allocated to the one or more SSBs that are exempt from contention-based procedures. The communications manager 1220 may be configured as or otherwise support a means for transmitting the P-CSI-RS within one or more third time periods that each include at least a respective portion of the one or more first time periods, where the one or more third time periods are based on an overlap between the one or more second time periods and the one or more first time periods.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of validating CSI-RS as described herein, or the processor 1240 and the memory 1230 may be otherwise configured to perform or support such operations.

Figure 13:
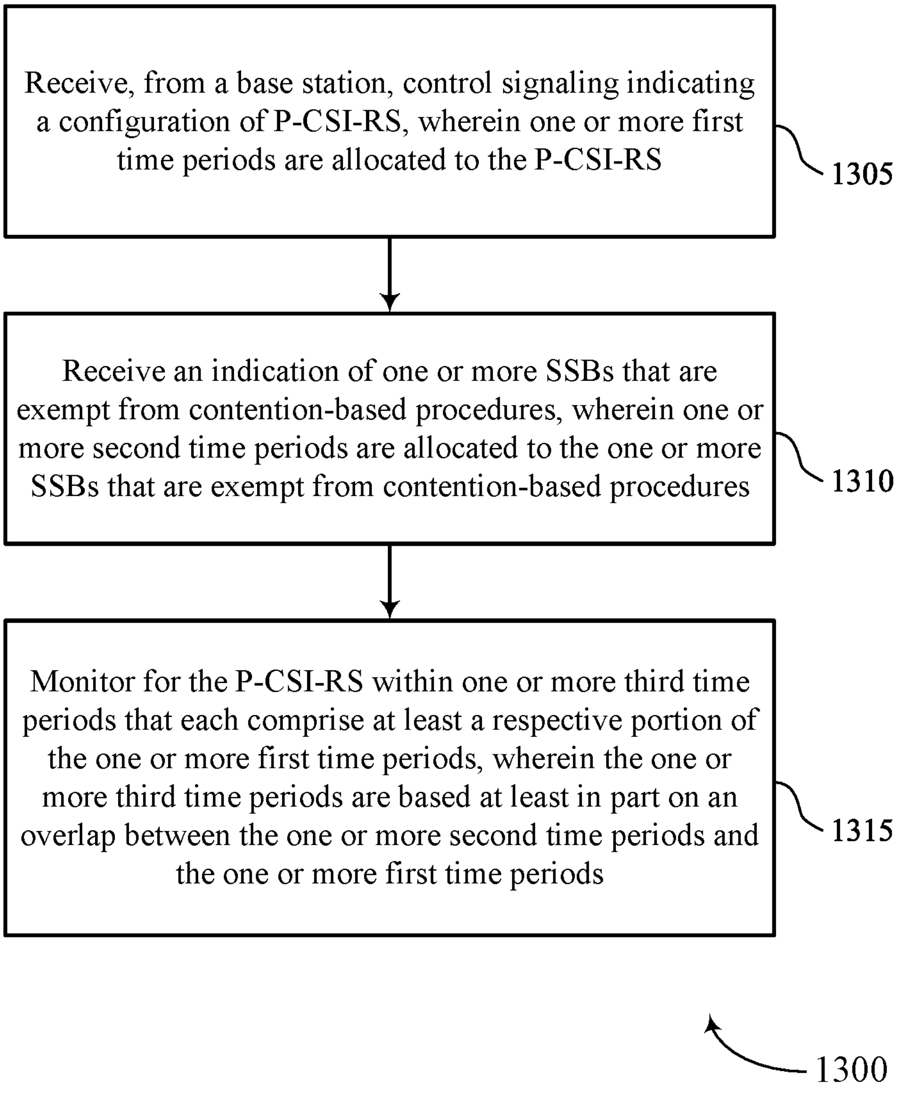
FIGS. 13 through 16 show flowcharts illustrating methods that support validating CSI-RS in accordance with aspects of the present disclosure.

FIG. 13 shows a flowchart illustrating a method 1300 that supports validating CSI-RS in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling indicating a configuration of P-CSI-RS, where one or more first time periods are allocated to the P-CSI-RS. The operations of 1305 may be performed in accordance with examples as disclosed herein. In some examples, aspects of the operations of 1305 may be performed by a P-CSI-RS configuration reception component 725 as described with reference to FIG. 7.

At 1310, the method may include receiving an indication of one or more SSBs that are exempt from contention-based procedures, where one or more second time periods are allocated to the one or more SSBs that are exempt from contention-based procedures. The operations of 1310 may be performed in accordance with examples as disclosed herein. In some examples, aspects of the operations of 1310 may be performed by an SSB indication reception component 730 as described with reference to FIG. 7.

At 1315, the method may include monitoring for the P-CSI-RS within one or more third time periods that each include at least a respective portion of the one or more first time periods, where the one or more third time periods are based on an overlap between the one or more second time periods and the one or more first time periods. The operations of 1315 may be performed in accordance with examples as disclosed herein. In some examples, aspects of the operations of 1315 may be performed by a P-CSI-RS monitoring component 735 as described with reference to FIG. 7.

Figure 14:
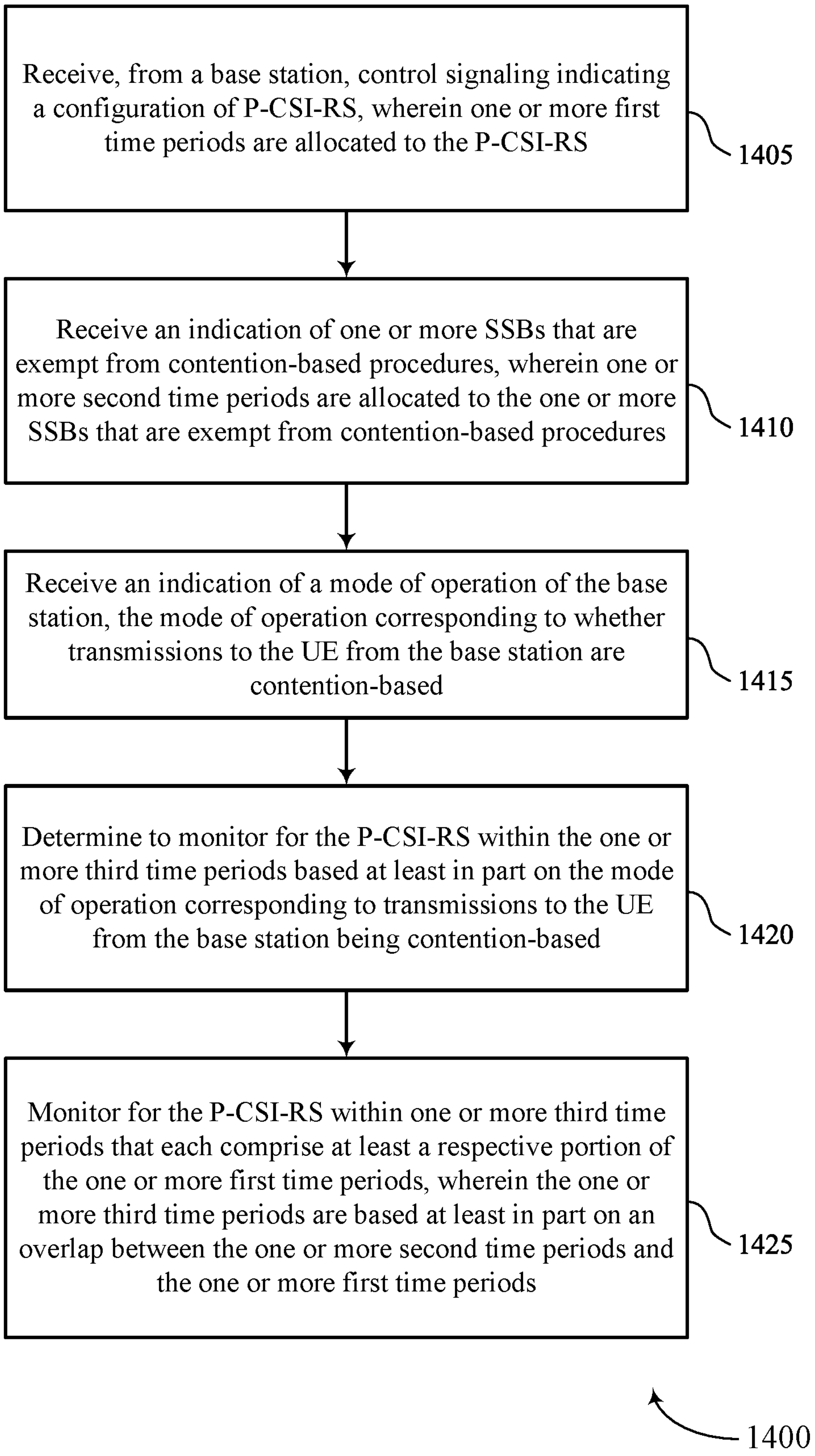

FIG. 14 shows a flowchart illustrating a method 1400 that supports validating CSI-RS in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling indicating a configuration of P-CSI-RS, where one or more first time periods are allocated to the P-CSI-RS. The operations of 1405 may be performed in accordance with examples as disclosed herein. In some examples, aspects of the operations of 1405 may be performed by a P-CSI-RS configuration reception component 725 as described with reference to FIG. 7.

At 1410, the method may include receiving an indication of one or more SSBs that are exempt from contention-based procedures, where one or more second time periods are allocated to the one or more SSBs that are exempt from contention-based procedures. The operations of 1410 may be performed in accordance with examples as disclosed herein. In some examples, aspects of the operations of 1410 may be performed by an SSB indication reception component 730 as described with reference to FIG. 7.

At 1415, the method may include receiving an indication of a mode of operation of the base station, the mode of operation corresponding to whether transmissions to the UE from the base station are contention-based. The operations of 1415 may be performed in accordance with examples as disclosed herein. In some examples, aspects of the operations of 1415 may be performed by an operational mode reception component 740 as described with reference to FIG. 7.

At 1420, the method may include determining to monitor for the P-CSI-RS within the one or more third time periods based on the mode of operation corresponding to transmissions to the UE from the base station being contention-based. The operations of 1420 may be performed in accordance with examples as disclosed herein. In some examples, aspects of the operations of 1420 may be performed by an operational mode reception component 740 as described with reference to FIG. 7.

At 1425, the method may include monitoring for the P-CSI-RS within one or more third time periods that each include at least a respective portion of the one or more first time periods, where the one or more third time periods are based on an overlap between the one or more second time periods and the one or more first time periods. The operations of 1425 may be performed in accordance with examples as disclosed herein. In some examples, aspects of the operations of 1425 may be performed by a P-CSI-RS monitoring component 735 as described with reference to FIG. 7.

Figure 15:
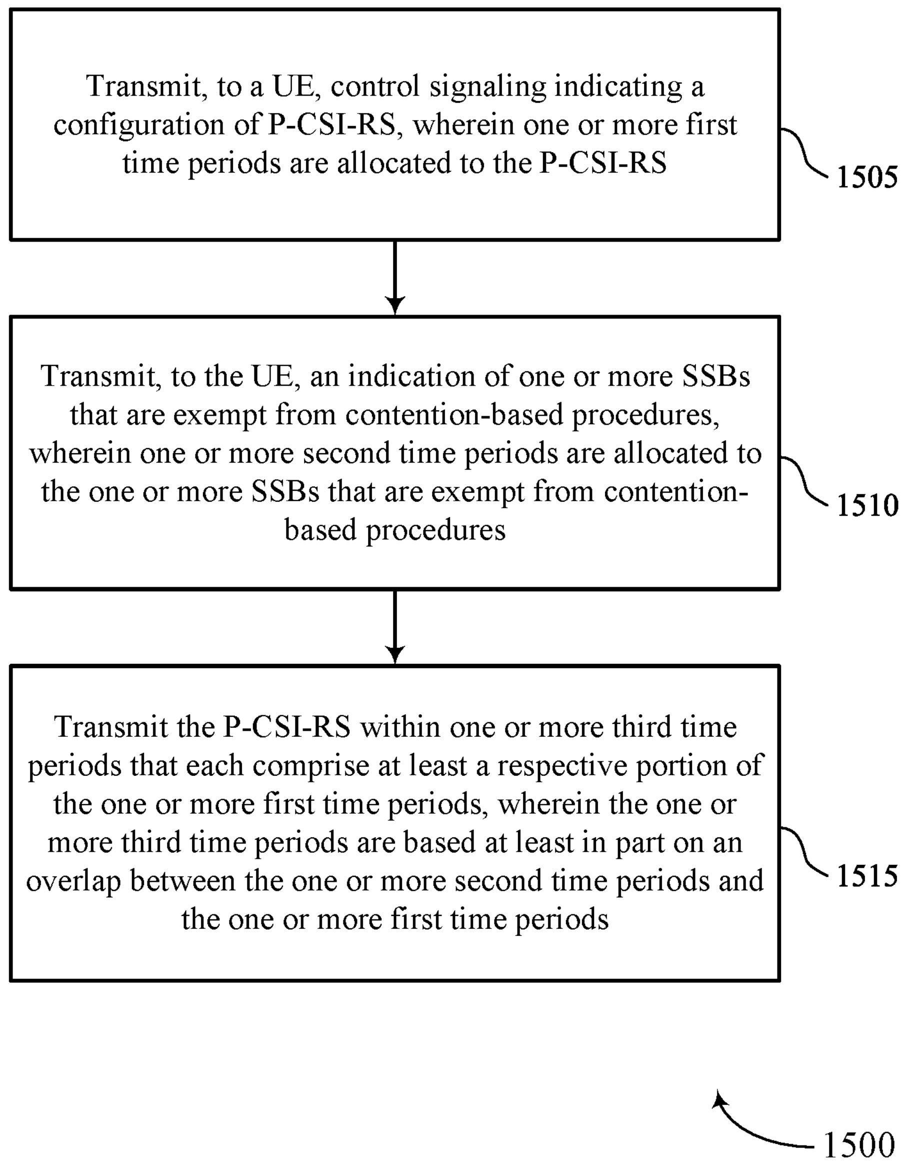

FIG. 15 shows a flowchart illustrating a method 1500 that supports validating CSI-RS in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, control signaling indicating a configuration of P-CSI-RS, where one or more first time periods are allocated to the P-CSI-RS. The operations of 1505 may be performed in accordance with examples as disclosed herein. In some examples, aspects of the operations of 1505 may be performed by a P-CSI-RS configuration component 1125 as described with reference to FIG. 11.

At 1510, the method may include transmitting, to the UE, an indication of one or more SSBs that are exempt from contention-based procedures, where one or more second time periods are allocated to the one or more SSBs that are exempt from contention-based procedures. The operations of 1510 may be performed in accordance with examples as disclosed herein. In some examples, aspects of the operations of 1510 may be performed by an SSB indication component 1130 as described with reference to FIG. 11.

At 1515, the method may include transmitting the P-CSI-RS within one or more third time periods that each include at least a respective portion of the one or more first time periods, where the one or more third time periods are based on an overlap between the one or more second time periods and the one or more first time periods. The operations of 1515 may be performed in accordance with examples as disclosed herein. In some examples, aspects of the operations of 1515 may be performed by a P-CSI-RS transmission component 1135 as described with reference to FIG. 11.

Figure 16:
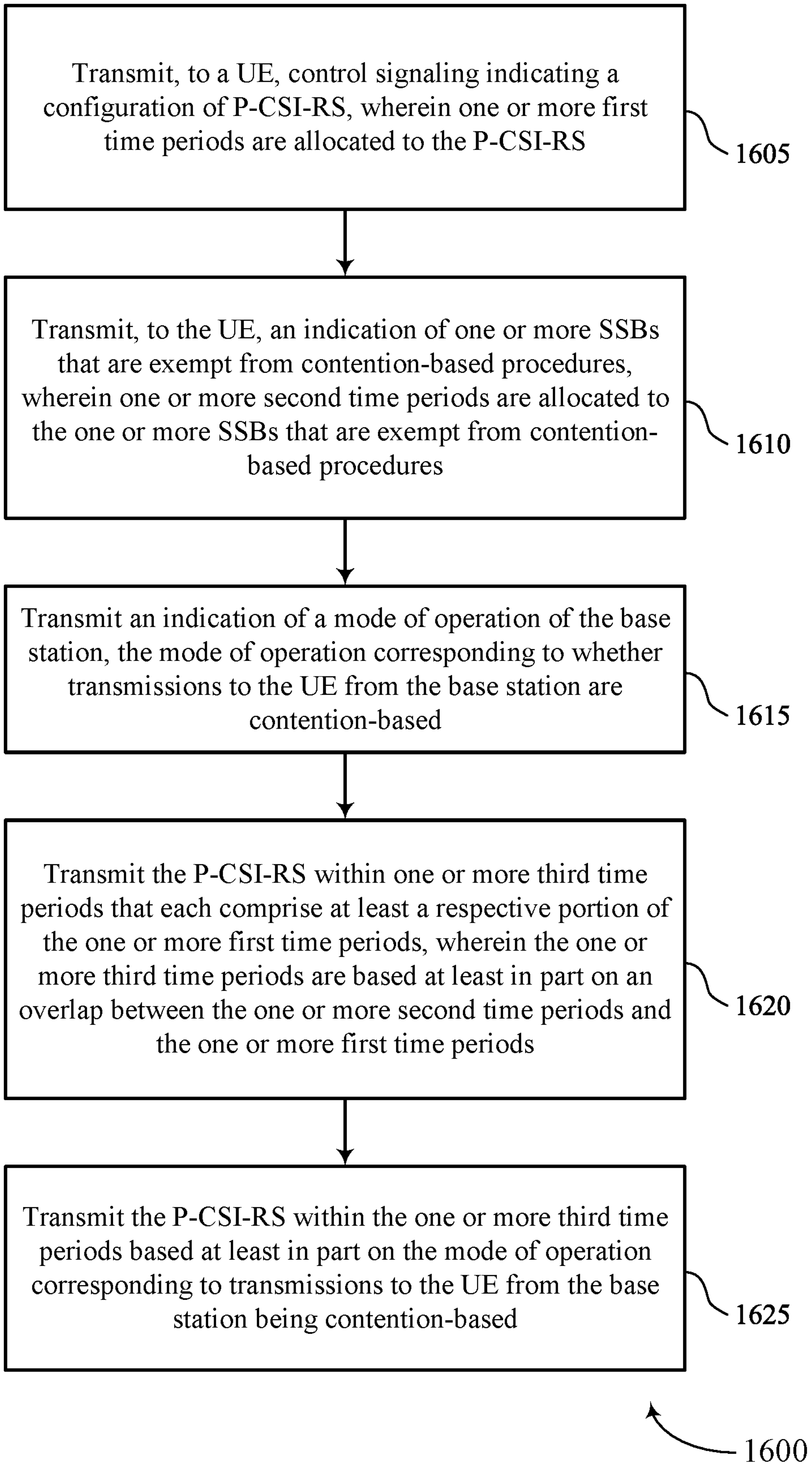

FIG. 16 shows a flowchart illustrating a method 1600 that supports validating CSI-RS in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling indicating a configuration of P-CSI-RS, where one or more first time periods are allocated to the P-CSI-RS. The operations of 1605 may be performed in accordance with examples as disclosed herein. In some examples, aspects of the operations of 1605 may be performed by a P-CSI-RS configuration component 1125 as described with reference to FIG. 11.

At 1610, the method may include transmitting, to the UE, an indication of one or more SSBs that are exempt from contention-based procedures, where one or more second time periods are allocated to the one or more SSBs that are exempt from contention-based procedures. The operations of 1610 may be performed in accordance with examples as disclosed herein. In some examples, aspects of the operations of 1610 may be performed by an SSB indication component 1130 as described with reference to FIG. 11.

At 1615, the method may include transmitting an indication of a mode of operation of the base station, the mode of operation corresponding to whether transmissions to the UE from the base station are contention-based. The operations of 1615 may be performed in accordance with examples as disclosed herein. In some examples, aspects of the operations of 1615 may be performed by an operational mode component 1140 as described with reference to FIG. 11.

At 1620, the method may include transmitting the P-CSI-RS within one or more third time periods that each include at least a respective portion of the one or more first time periods, where the one or more third time periods are based on an overlap between the one or more second time periods and the one or more first time periods. The operations of 1620 may be performed in accordance with examples as disclosed herein. In some examples, aspects of the operations of 1620 may be performed by a P-CSI-RS transmission component 1135 as described with reference to FIG. 11.

At 1625, the method may include transmitting the P-CSI-RS within the one or more third time periods based on the mode of operation corresponding to transmissions to the UE from the base station being contention-based. The operations of 1625 may be performed in accordance with examples as disclosed herein. In some examples, aspects of the operations of 1625 may be performed by an operational mode component 1140 as described with reference to FIG. 11.

The following provides an overview of aspects of the present disclosure:

Aspect 1: A method for wireless communication at a UE, comprising: receiving, from a base station, control signaling indicating a configuration of P-CSI-RS, wherein one or more first time periods are allocated to the P-CSI-RS; receiving an indication of one or more SSBs that are exempt from contention-based procedures, wherein one or more second time periods are allocated to the one or more SSBs that are exempt from contention-based procedures; and monitoring for the P-CSI-RS within one or more third time periods that each comprise at least a respective portion of the one or more first time periods, wherein the one or more third time periods are based at least in part on an overlap between the one or more second time periods and the one or more first time periods.

Aspect 2: The method of aspect 1, further comprising: receiving an indication of a mode of operation of the base station, the mode of operation corresponding to whether transmissions to the UE from the base station are contention-based; and determining to monitor for the P-CSI-RS within the one or more third time periods based at least in part on the mode of operation corresponding to transmissions to the UE from the base station being contention-based.

Aspect 3: The method of any of aspects 1 through 2, further comprising: determining that a subset of the one or more first time periods overlap with a subset of the one or more second time periods, wherein monitoring for the P-CSI-RS within the one or more third time periods is based at least in part on the determining, and wherein the one or more third time periods comprise the subset of the one or more first time periods.

Aspect 4: The method of any of aspects 1 through 3, further comprising: determining whether to monitor for the P-CSI-RS in a subset of the one or more first time periods different from the one or more third time periods based at least in part on a COT of the base station, a grant of resources for a downlink shared channel, a grant of resources for AP-CSI-RS, or any combination thereof.

Aspect 5: The method of any of aspects 1 through 4, wherein the one or more second time periods comprise a set of slots, at least one SSB of the one or more SSBs transmitted in each slot of the set of slots.

Aspect 6: The method of aspect 5, wherein the one or more second time periods further comprise one or more slots exclusive of the one or more SSBs, the one or more slots intervening between a first slot and a second slot of the set of slots, the first slot associated with a first SSB of the one or more SSBs and the second slot associated with a second SSB of the one or more SSBs.

Aspect 7: The method of any of aspects 1 through 4, wherein the one or more second time periods comprise a starting symbol of a first SSB of the one or more SSBs, an ending symbol of a second SSB of the one or more SSBs, and any intervening symbols between the starting symbol of the first SSB and the ending symbol of the second SSB.

Aspect 8: The method of any of aspects 1 through 4, wherein the one or more second time periods comprise symbols occupied by the one or more SSBs.

Aspect 9: The method of any of aspects 1 through 8, further comprising: receiving an indication of one or more second SSBs that are exempt from the contention-based procedures, wherein one or more fourth time periods are allocated to the one or more second SSBs, and wherein a set of SSBs to which the contention-based procedures apply intervene between the one or more SSBs and the one or more second SSBs; and monitoring for the P-CSI-RS within one or more fifth time periods that each comprise at least a respective portion of the one or more first time periods, wherein the one or more fifth time periods are based at least in part on an overlap between the one or more fourth time periods and the one or more first time periods.

Aspect 10: The method of any of aspects 1 through 9, wherein one or more slots intervene between a first slot associated with a first SSB of the one or more SSBs and a second slot associated with a second SSB of the one or more SSBs, the one or more slots exclusive of the one or more SSBs.

Aspect 11: The method of any of aspects 1 through 10, wherein the P-CSI-RS are multiplexed with at least one of the one or more SSBs over the one or more third time periods.

Aspect 12: The method of any of aspects 1 through 11, wherein receiving the indication of the one or more SSBs comprises: receiving an indication of a set of indices corresponding to the one or more SSBs; receiving an indication of a starting index of the one or more SSBs and a quantity of SSBs included in the one or more SSBs; receiving a starting time and a time duration for transmission of the one or more SSBs; or any combination thereof.

Aspect 13: A method for wireless communication at a base station, comprising: transmitting, to a UE, control signaling indicating a configuration of P-CSI-RS, wherein one or more first time periods are allocated to the P-CSI-RS; transmitting, to the UE, an indication of one or more SSBs that are exempt from contention-based procedures, wherein one or more second time periods are allocated to the one or more SSBs that are exempt from contention-based procedures; and transmitting the P-CSI-RS within one or more third time periods that each comprise at least a respective portion of the one or more first time periods, wherein the one or more third time periods are based at least in part on an overlap between the one or more second time periods and the one or more first time periods.

Aspect 14: The method of aspect 13, further comprising: transmitting an indication of a mode of operation of the base station, the mode of operation corresponding to whether transmissions to the UE from the base station are contention-based; and transmitting the P-CSI-RS within the one or more third time periods based at least in part on the mode of operation corresponding to transmissions to the UE from the base station being contention-based.

Aspect 15: The method of any of aspects 13 through 14, further comprising: determining that a subset of the one or more first time periods overlap with a subset of the one or more second time periods, wherein transmitting the P-CSI-RS within the one or more third time periods is based at least in part on the determining, and wherein the one or more third time periods comprise the subset of the one or more first time periods.

Aspect 16: The method of any of aspects 13 through 15, further comprising: determining whether to transmit the P-CSI-RS in a subset of the one or more first time periods different from the one or more third time periods based at least in part on a COT of the base station, a grant of resources for a downlink shared channel, a grant of resources for AP-CSI-RS, or any combination thereof.

Aspect 17: The method of any of aspects 13 through 16, wherein the one or more second time periods comprise a set of slots, at least one SSB of the one or more SSBs transmitted in each slot of the set of slots.

Aspect 18: The method of aspect 17, wherein the one or more second time periods further comprise one or more slots exclusive of the one or more SSBs, the one or more slots intervening between a first slot and a second slot of the set of slots, the first slot associated with a first SSB of the one or more SSBs and the second slot associated with a second SSB of the one or more SSBs.

Aspect 19: The method of any of aspects 13 through 16, wherein the one or more second time periods comprise a starting symbol of a first SSB of the one or more SSBs, an ending symbol of a second SSB of the one or more SSBs, and any intervening symbols between the starting symbol of the first SSB and the ending symbol of the second SSB.

Aspect 20: The method of any of aspects 13 through 16, wherein the one or more second time periods comprise symbols occupied by the one or more SSBs.

Aspect 21: The method of any of aspects 13 through 20, further comprising: transmitting an indication of one or more second SSBs that are exempt from the contention-based procedures, wherein one or more fourth time periods are allocated to the one or more second SSBs, and wherein a set of SSBs to which the contention-based procedures apply intervene between the one or more SSBs and the one or more second SSBs; and transmitting the P-CSI-RS within one or more fifth time periods that each comprise at least a respective portion of the one or more first time periods, wherein the one or more fifth time periods are based at least in part on an overlap between the one or more fourth time periods and the one or more first time periods.

Aspect 22: The method of any of aspects 13 through 21, wherein one or more slots intervene between a first slot associated with a first SSB of the one or more SSBs and a second slot associated with a second SSB of the one or more SSBs, the one or more slots exclusive of the one or more SSBs.

Aspect 23: The method of any of aspects 13 through 22, wherein transmitting the P-CSI-RS comprises: multiplexing the P-CSI-RS with at least one of the one or more SSBs over the one or more third time periods.

Aspect 24: The method of any of aspects 13 through 23, wherein transmitting the indication of the one or more SSBs comprises: transmitting an indication of a set of indices corresponding to the one or more SSBs; transmitting an indication of a starting index of the one or more SSBs and a quantity of SSBs included in the one or more SSBs; transmitting a starting time and a time duration for transmission of the one or more SSBs; or any combination thereof.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions. Also, as used herein, the phrase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
one or more processors;
memory coupled with the one or more processors; and
instructions stored in the memory and executable by the one or more processors to cause the apparatus to:
receive, from a base station, control signaling indicating a configuration of periodic channel state information reference signals, wherein one or more first time periods are allocated to the periodic channel state information reference signals;
receive an indication of one or more synchronization signal blocks that are exempt from contention-based procedures, wherein one or more second time periods are allocated to the one or more synchronization signal blocks that are exempt from contention-based procedures; and
monitor for the periodic channel state information reference signals within one or more third time periods that each comprise at least a respective portion of the one or more first time periods, wherein the one or more third time periods are based at least in part on an overlap between the one or more second time periods and the one or more first time periods.

2. The apparatus of claim 1, wherein the instructions are further executable by the one or more processors to cause the apparatus to:
receive an indication of a mode of operation of the base station, the mode of operation corresponding to whether transmissions to the UE from the base station are contention-based; and
determine to monitor for the periodic channel state information reference signals within the one or more third time periods based at least in part on the mode of operation corresponding to transmissions to the UE from the base station being contention-based.

3. The apparatus of claim 1, wherein the instructions are further executable by the one or more processors to cause the apparatus to:
determine that a subset of the one or more first time periods overlap with a subset of the one or more second time periods, wherein monitoring for the periodic channel state information reference signals within the one or more third time periods is based at least in part on the determining, and wherein the one or more third time periods comprise the subset of the one or more first time periods.

4. The apparatus of claim 1, wherein the instructions are further executable by the one or more processors to cause the apparatus to:
determine whether to monitor for the periodic channel state information reference signals in a subset of the one or more first time periods different from the one or more third time periods based at least in part on a channel occupancy time of the base station, a grant of resources for a downlink shared channel, a grant of resources for aperiodic channel state information reference signals, or any combination thereof.

5. The apparatus of claim 1, wherein the one or more second time periods comprise a set of slots, at least one synchronization signal block of the one or more synchronization signal blocks transmitted in each slot of the set of slots.

6. The apparatus of claim 5, wherein the one or more second time periods further comprise one or more slots exclusive of the one or more synchronization signal blocks, the one or more slots intervening between a first slot and a second slot of the set of slots, the first slot associated with a first synchronization signal block of the one or more synchronization signal blocks and the second slot associated with a second synchronization signal block of the one or more synchronization signal blocks.

7. The apparatus of claim 1, wherein the one or more second time periods comprise a starting symbol of a first synchronization signal block of the one or more synchronization signal blocks, an ending symbol of a second synchronization signal block of the one or more synchronization signal blocks, and any intervening symbols between the starting symbol of the first synchronization signal block and the ending symbol of the second synchronization signal block.

8. The apparatus of claim 1, wherein the one or more second time periods comprise symbols occupied by the one or more synchronization signal blocks.

9. The apparatus of claim 1, wherein the instructions are further executable by the one or more processors to cause the apparatus to:
receive an indication of one or more second synchronization signal blocks that are exempt from the contention-based procedures, wherein one or more fourth time periods are allocated to the one or more second synchronization signal blocks, and wherein a set of synchronization signal blocks to which the contention-based procedures apply intervene between the one or more synchronization signal blocks and the one or more second synchronization signal blocks; and
monitor for the periodic channel state information reference signals within one or more fifth time periods that each comprise at least a respective portion of the one or more first time periods, wherein the one or more fifth time periods are based at least in part on an overlap between the one or more fourth time periods and the one or more first time periods.

10. The apparatus of claim 1, wherein one or more slots intervene between a first slot associated with a first synchronization signal block of the one or more synchronization signal blocks and a second slot associated with a second synchronization signal block of the one or more synchronization signal blocks, the one or more slots exclusive of the one or more synchronization signal blocks.

11. The apparatus of claim 1, wherein the periodic channel state information reference signals are multiplexed with at least one of the one or more synchronization signal blocks over the one or more third time periods.

12. The apparatus of claim 1, wherein, to receive the indication of the one or more synchronization signal blocks, the instructions are executable by the one or more processors to cause the apparatus to:
receive an indication of a set of indices corresponding to the one or more synchronization signal blocks;
receive an indication of a starting index of the one or more synchronization signal blocks and a quantity of synchronization signal blocks included in the one or more synchronization signal blocks;

receive a starting time and a time duration for transmission of the one or more synchronization signal blocks; or any combination thereof.

13. An apparatus for wireless communication at a base station, comprising:

one or more processors;

memory coupled with the one or more processors; and instructions stored in the memory and executable by the one or more processors to cause the apparatus to:

transmit, to a user equipment (UE), control signaling indicating a configuration of periodic channel state information reference signals, wherein one or more first time periods are allocated to the periodic channel state information reference signals;

transmit, to the UE, an indication of one or more synchronization signal blocks that are exempt from contention-based procedures, wherein one or more second time periods are allocated to the one or more synchronization signal blocks that are exempt from contention-based procedures; and transmit the periodic channel state information reference signals within one or more third time periods that each comprise at least a respective portion of the one or more first time periods, wherein the one or more third time periods are based at least in part on an overlap between the one or more second time periods and the one more first time periods.

14. The apparatus of claim 13, wherein the instructions are further executable by the one or more processors to cause the apparatus to:

transmit an indication of a mode of operation of the base station, the mode of operation corresponding to whether transmissions to the UE from the base station are contention-based; and transmit the periodic channel state information reference signals within the one or more third time periods based at least in part on the mode of operation corresponding to transmissions to the UE from the base station being contention-based.

15. The apparatus of claim 13, wherein the instructions are further executable by the one or more processors to cause the apparatus to:

determine that a subset of the one or more first time periods overlap with a subset of the one or more second time periods, wherein transmitting the periodic channel state information reference signals within the one or more third time periods is based at least in part on the determining, and wherein the one or more third time periods comprise the subset of the one or more first time periods.

16. The apparatus of claim 13, wherein the instructions are further executable by the one or more processors to cause the apparatus to:

determine whether to transmit the periodic channel state information reference signals in a subset of the one or more first time periods different from the one or more third time periods based at least in part on a channel occupancy time of the base station, a grant of resources for a downlink shared channel, a grant of resources for aperiodic channel state information reference signals, or any combination thereof.

17. The apparatus of claim 13, wherein the one or more second time periods comprise a set of slots, at least one synchronization signal block of the one or more synchronization signal blocks transmitted in each slot of the set of slots.

18. The apparatus of claim 17, wherein the one or more second time periods further comprise one or more slots exclusive of the one or more synchronization signal blocks, the one or more slots intervening between a first slot and a second slot of the set of slots, the first slot associated with a first synchronization signal block of the one or more synchronization signal blocks and the second slot associated with a second synchronization signal block of the one or more synchronization signal blocks.

19. The apparatus of claim 13, wherein the one or more second time periods comprise a starting symbol of a first synchronization signal block of the one or more synchronization signal blocks, an ending symbol of a second synchronization signal block of the one or more synchronization signal blocks, and any intervening symbols between the starting symbol of the first synchronization signal block and the ending symbol of the second synchronization signal block.

20. The apparatus of claim 13, wherein the one or more second time periods comprise symbols occupied by the one or more synchronization signal blocks.

21. The apparatus of claim 13, wherein the instructions are further executable by the one or more processors to cause the apparatus to:

transmit an indication of one or more second synchronization signal blocks that are exempt from the contention-based procedures, wherein one or more fourth time periods are allocated to the one or more second synchronization signal blocks, and wherein a set of synchronization signal blocks to which the contention-based procedures apply intervene between the one or more synchronization signal blocks and the one or more second synchronization signal blocks; and transmit the periodic channel state information reference signals within one or more fifth time periods that each comprise at least a respective portion of the one or more first time periods, wherein the one or more fifth time periods are based at least in part on an overlap between the one or more fourth time periods and the one or more first time periods.

22. The apparatus of claim 13, wherein one or more slots intervene between a first slot associated with a first synchronization signal block of the one or more synchronization signal blocks and a second slot associated with a second synchronization signal block of the one or more synchronization signal blocks, the one or more slots exclusive of the one or more synchronization signal blocks.

23. The apparatus of claim 13, wherein, to transmit the periodic channel state information reference signals, the instructions are executable by the one or more processors to cause the apparatus to:

multiplex the periodic channel state information reference signals with at least one of the one or more synchronization signal blocks over the one or more third time periods.

24. The apparatus of claim 13, wherein, to transmit the indication of the one or more synchronization signal blocks, the instructions are executable by the one or more processors to cause the apparatus to:

transmit an indication of a set of indices corresponding to the one or more synchronization signal blocks;

transmit an indication of a starting index of the one or more synchronization signal blocks and a quantity of synchronization signal blocks included in the one or more synchronization signal blocks;

transmit a starting time and a time duration for transmission of the one or more synchronization signal blocks; or any combination thereof.

25. A method for wireless communication at a user equipment (UE), comprising:

receiving, from a base station, control signaling indicating a configuration of periodic channel state information reference signals, wherein one or more first time periods are allocated to the periodic channel state information reference signals;

receiving an indication of one or more synchronization signal blocks that are exempt from contention-based procedures, wherein one or more second time periods are allocated to the one or more synchronization signal blocks that are exempt from contention-based procedures; and monitoring for the periodic channel state information reference signals within one or more third time periods that each comprise at least a respective portion of the one or more first time periods, wherein the one or more third time periods are based at least in part on an overlap between the one or more second time periods and the one or more first time periods.

26. The method of claim 25, further comprising:

receiving an indication of a mode of operation of the base station, the mode of operation corresponding to whether transmissions to the UE from the base station are contention-based; and determining to monitor for the periodic channel state information reference signals within the one or more third time periods based at least in part on the mode of operation corresponding to transmissions to the UE from the base station being contention-based.

27. The method of claim 25, wherein the one or more second time periods comprise a set of slots, at least one synchronization signal block of the one or more synchronization signal blocks transmitted in each slot of the set of slots.

28. The method of claim 27, wherein the one or more second time periods further comprise one or more slots exclusive of the one or more synchronization signal blocks, the one or more slots intervening between a first slot and a second slot of the set of slots, the first slot associated with a first synchronization signal block of the one or more synchronization signal blocks and the second slot associated with a second synchronization signal block of the one or more synchronization signal blocks.

29. The method of claim 25, wherein the one or more second time periods comprise a starting symbol of a first synchronization signal block of the one or more synchronization signal blocks, an ending symbol of a second synchronization signal block of the one or more synchronization signal blocks, and any intervening symbols between the starting symbol of the first synchronization signal block and the ending symbol of the second synchronization signal block.

30. A method for wireless communication at a base station, comprising:

transmitting, to a user equipment (UE), control signaling indicating a configuration of periodic channel state information reference signals, wherein one or more first time periods are allocated to the periodic channel state information reference signals;

transmitting, to the UE, an indication of one or more synchronization signal blocks that are exempt from contention-based procedures, wherein one or more second time periods are allocated to the one or more synchronization signal blocks that are exempt from contention-based procedures; and transmitting the periodic channel state information reference signals within one or more third time periods that each comprise at least a respective portion of the one or more first time periods, wherein the one or more third time periods are based at least in part on an overlap between the one or more second time periods and the one or more first time periods.

* * * * *